Aug. 18, 1953 M. H. NOVEMBER 2,649,120
MACHINE FOR BINDING BOOKS
Filed July 2, 1948 19 Sheets-Sheet 1

INVENTOR.
MILTON H. NOVEMBER
BY
ATTORNEYS.

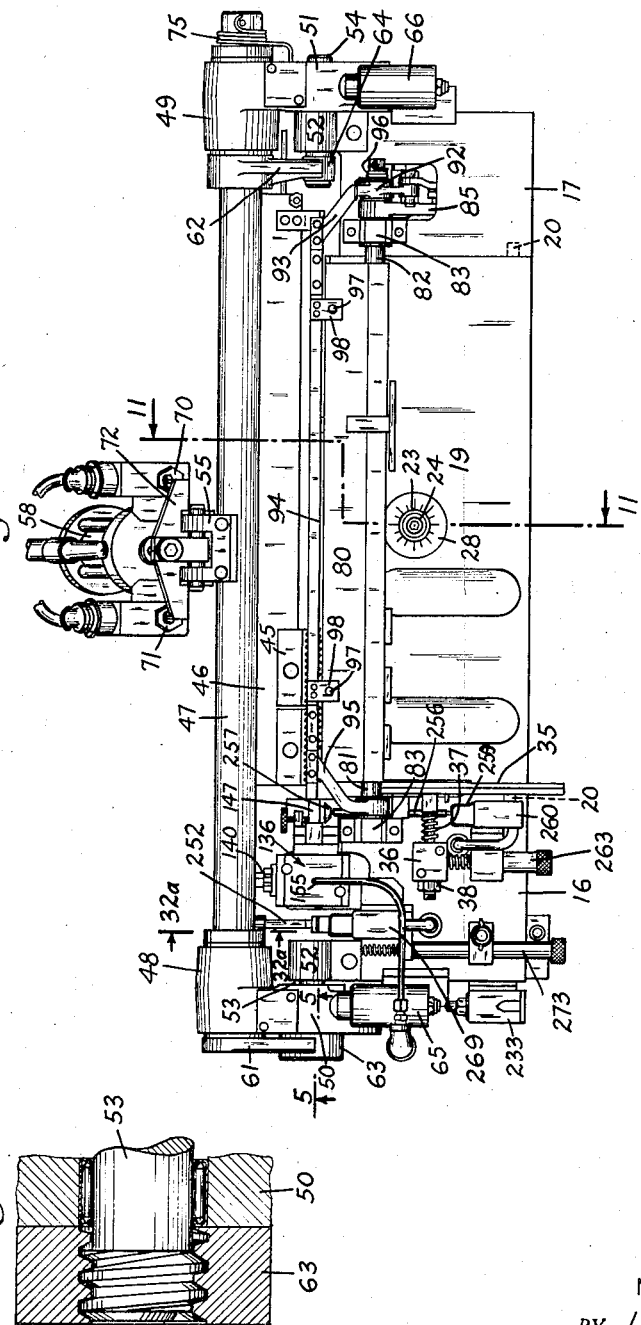

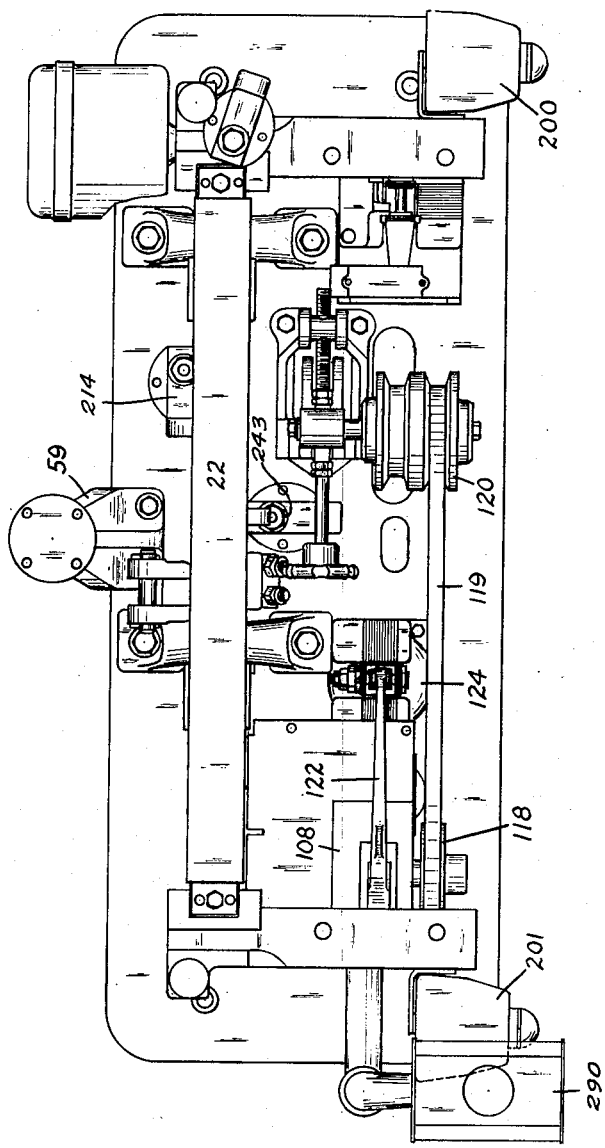

Aug. 18, 1953     M. H. NOVEMBER     2,649,120
MACHINE FOR BINDING BOOKS
Filed July 2, 1948                         19 Sheets-Sheet 6
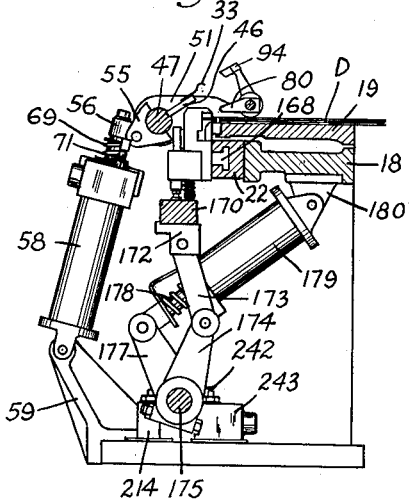
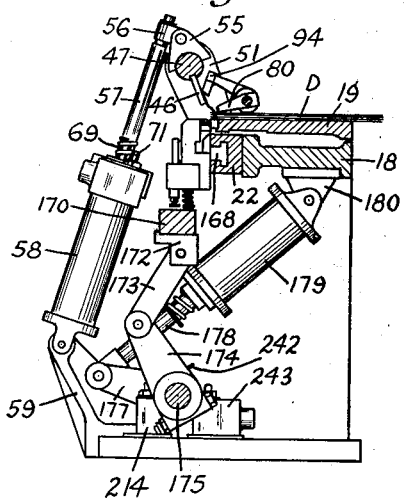
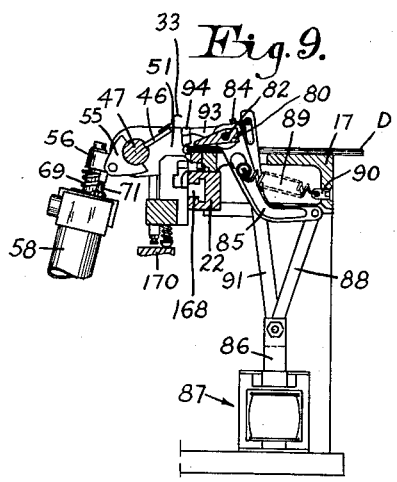
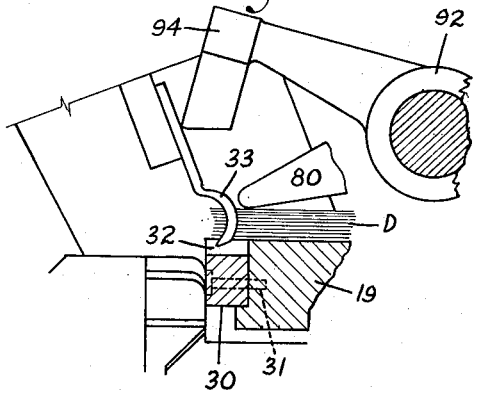
INVENTOR.
MILTON H. NOVEMBER
BY
ATTORNEYS.

Aug. 18, 1953     M. H. NOVEMBER     2,649,120
MACHINE FOR BINDING BOOKS
Filed July 2, 1948     19 Sheets-Sheet 7
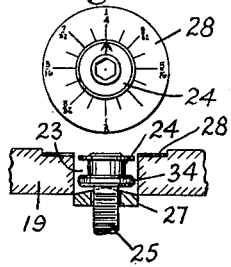
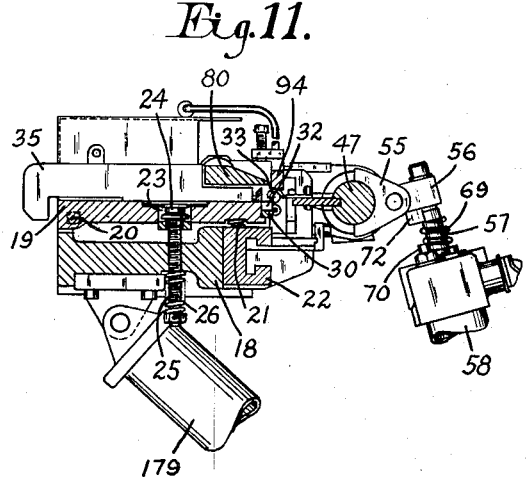
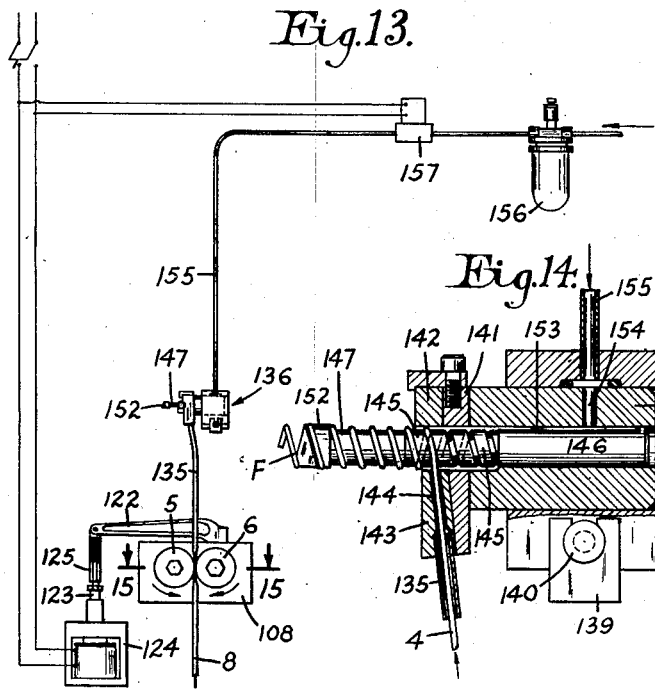
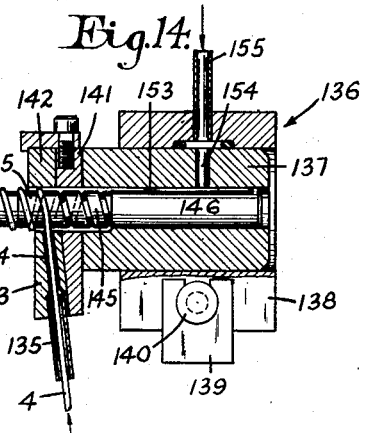
INVENTOR.
MILTON H. NOVEMBER
BY
ATTORNEYS.

Aug. 18, 1953

M. H. NOVEMBER 2,649,120

MACHINE FOR BINDING BOOKS

Filed July 2, 1948

INVENTOR.
MILTON H. NOVEMBER

BY Klein, Alexander & Pohl

ATTORNEYS.

Aug. 18, 1953     M. H. NOVEMBER     2,649,120
MACHINE FOR BINDING BOOKS
Filed July 2, 1948                                         19 Sheets-Sheet 9
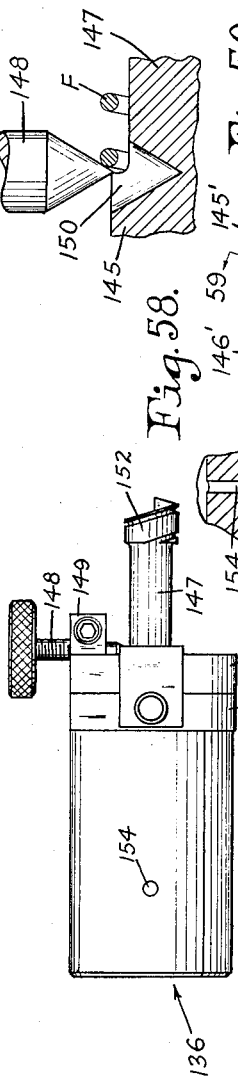
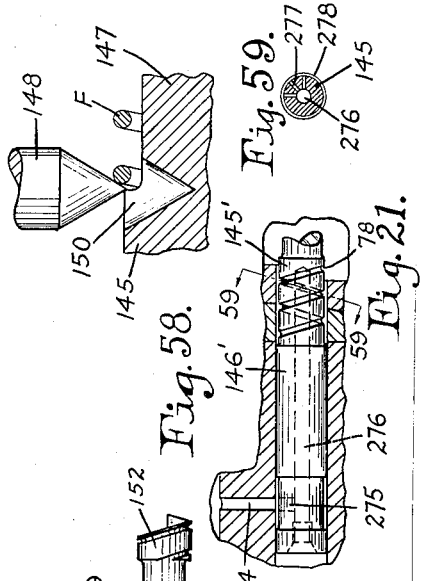
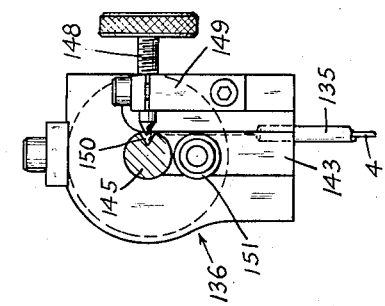
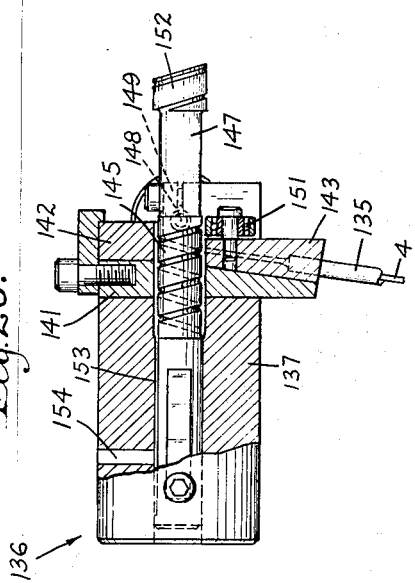
INVENTOR.
MILTON H. NOVEMBER
BY *Klein, Alexander & Pohl*
ATTORNEYS.

Aug. 18, 1953   M. H. NOVEMBER   2,649,120
MACHINE FOR BINDING BOOKS
Filed July 2, 1948   19 Sheets-Sheet 10
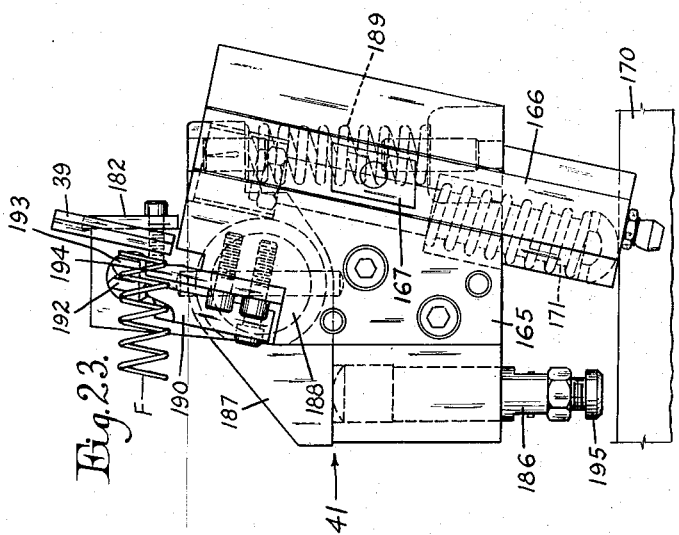
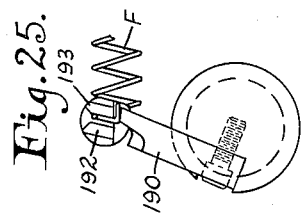
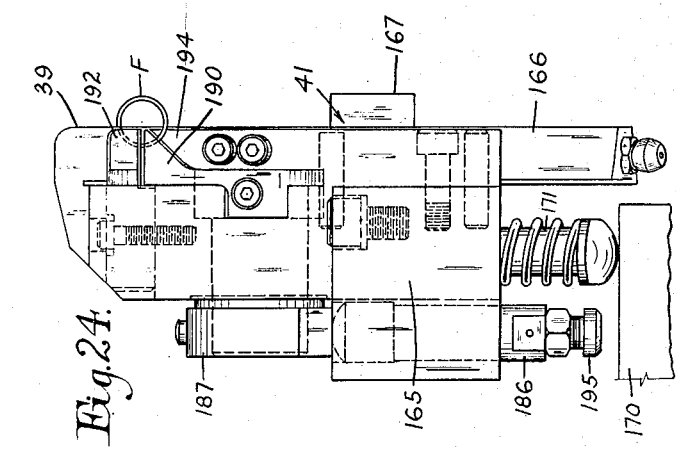
INVENTOR.
MILTON H. NOVEMBER
BY *Klein, Alexander + Rohe*
ATTORNEYS.

Aug. 18, 1953          M. H. NOVEMBER              2,649,120
                    MACHINE FOR BINDING BOOKS
Filed July 2, 1948                              19 Sheets-Sheet 11
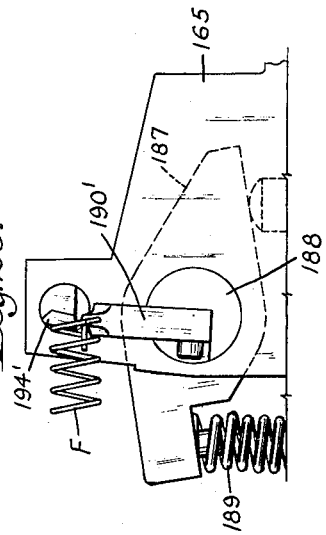
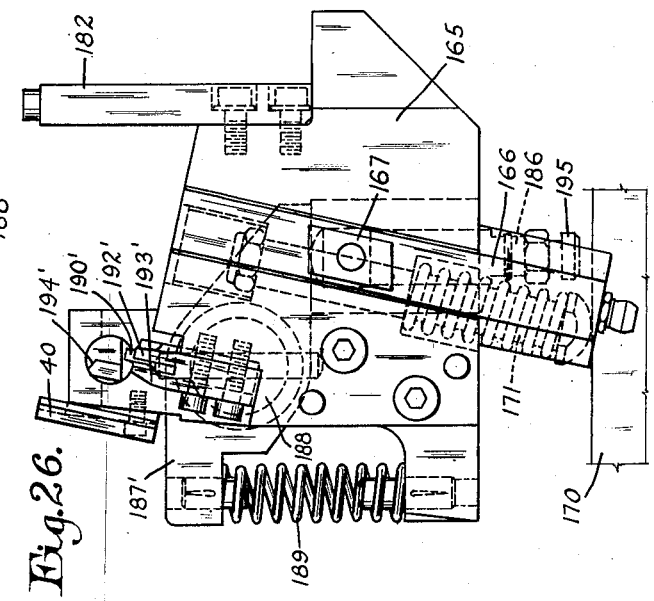
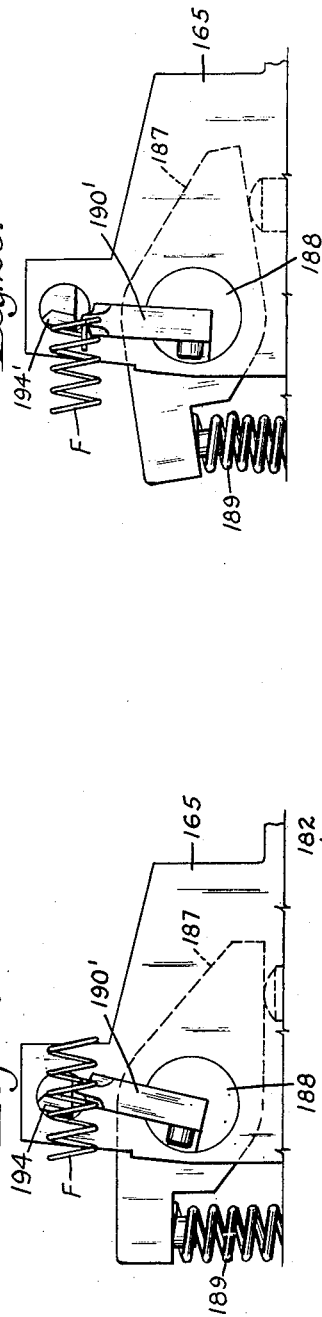
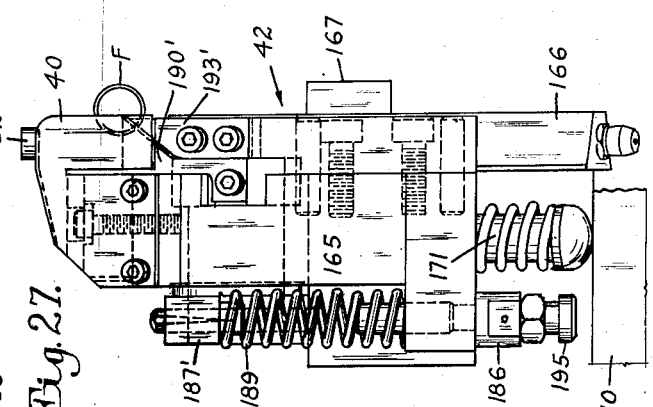
INVENTOR.
MILTON H. NOVEMBER
ATTORNEYS.

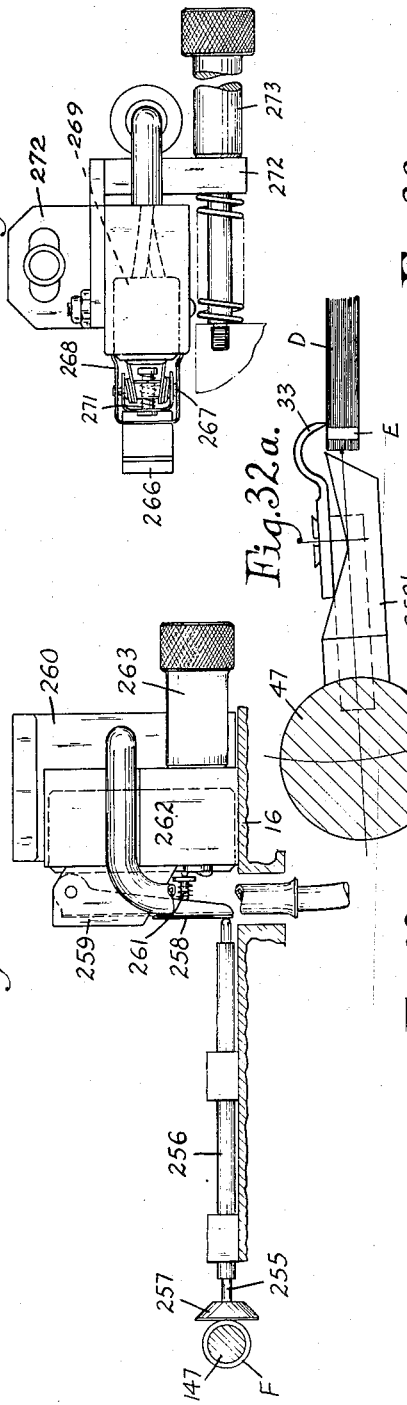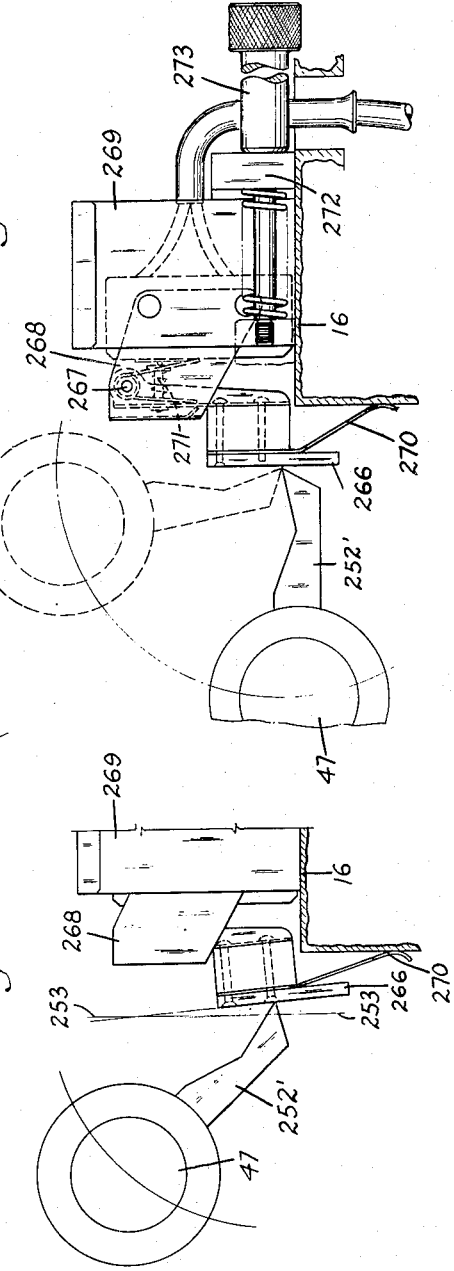

Aug. 18, 1953     M. H. NOVEMBER     2,649,120
MACHINE FOR BINDING BOOKS
Filed July 2, 1948     19 Sheets-Sheet 13

INVENTOR.
MILTON H. NOVEMBER

BY *Klein, Alexander & Poth*

ATTORNEYS.

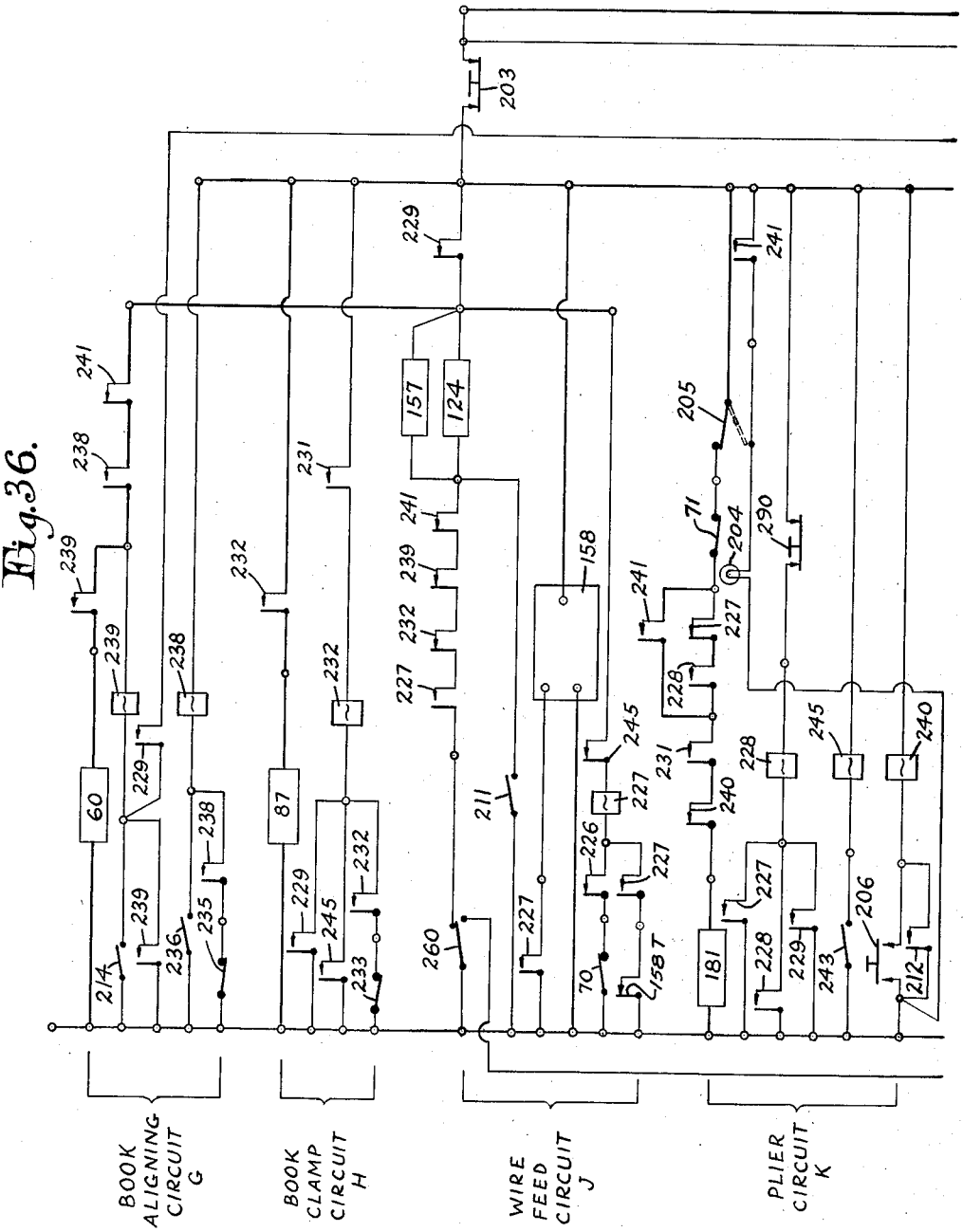

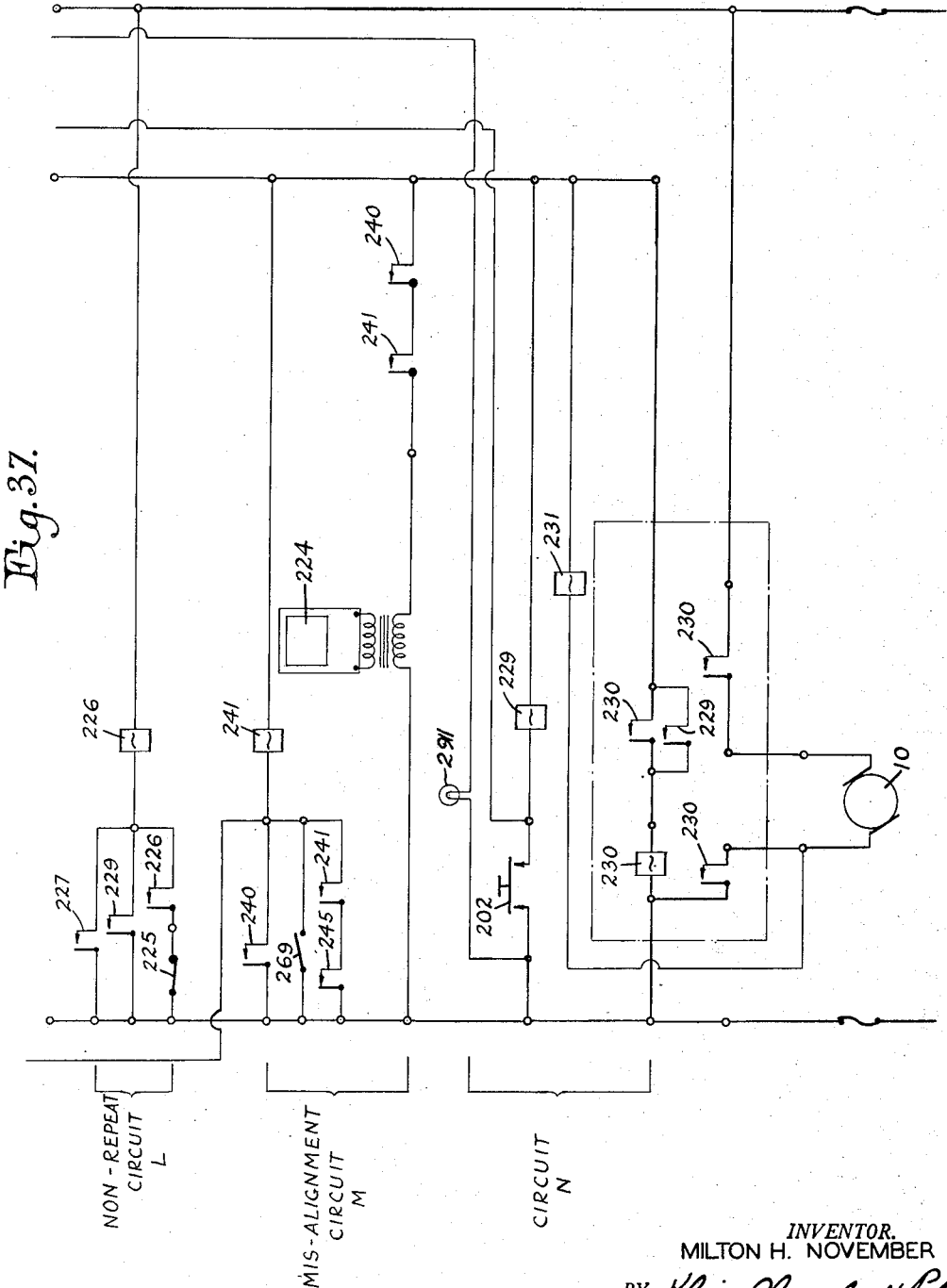

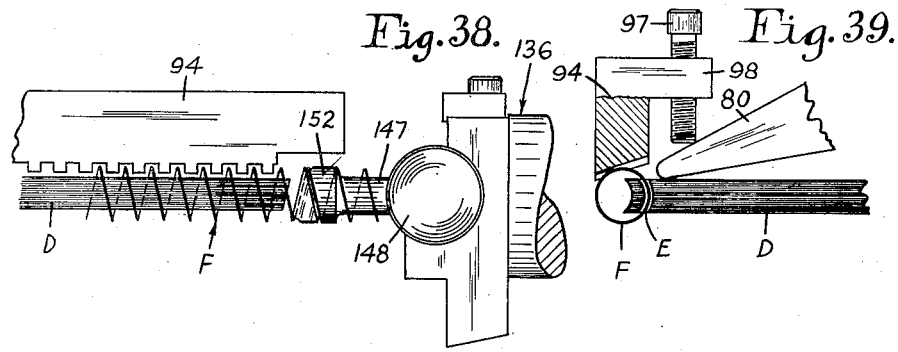
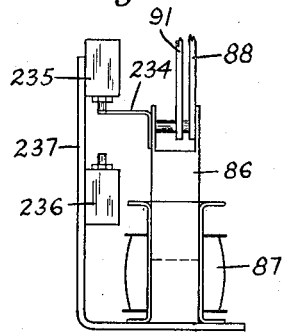
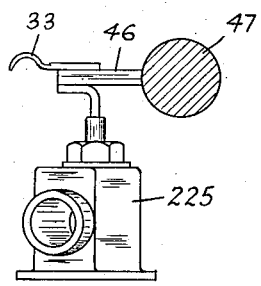
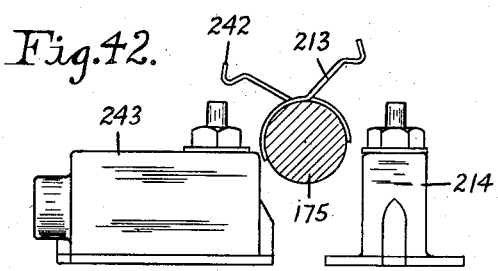

Aug. 18, 1953          M. H. NOVEMBER          2,649,120
                    MACHINE FOR BINDING BOOKS
Filed July 2, 1948                      19 Sheets-Sheet 17
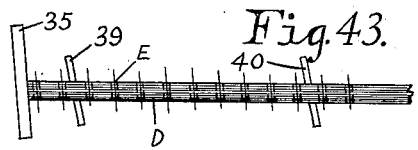
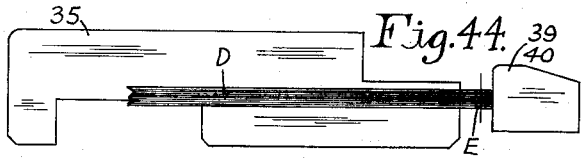
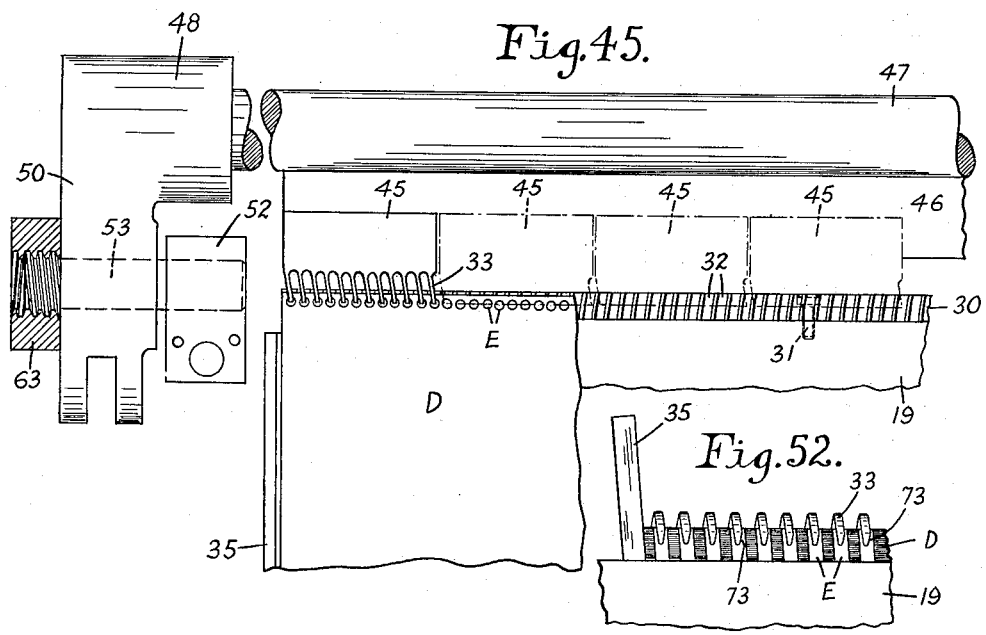
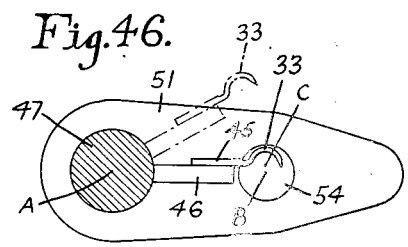
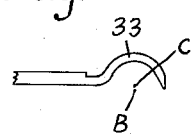
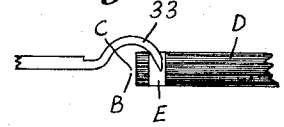
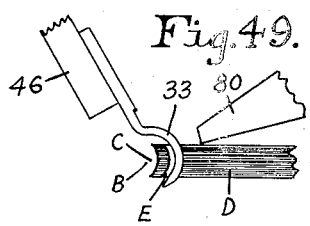
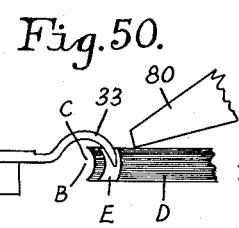
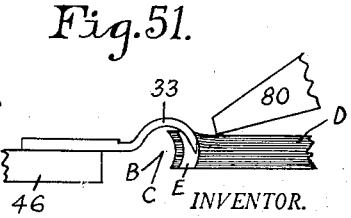
INVENTOR.
MILTON H. NOVEMBER
BY Klein, Alexander + Pohl
ATTORNEYS.

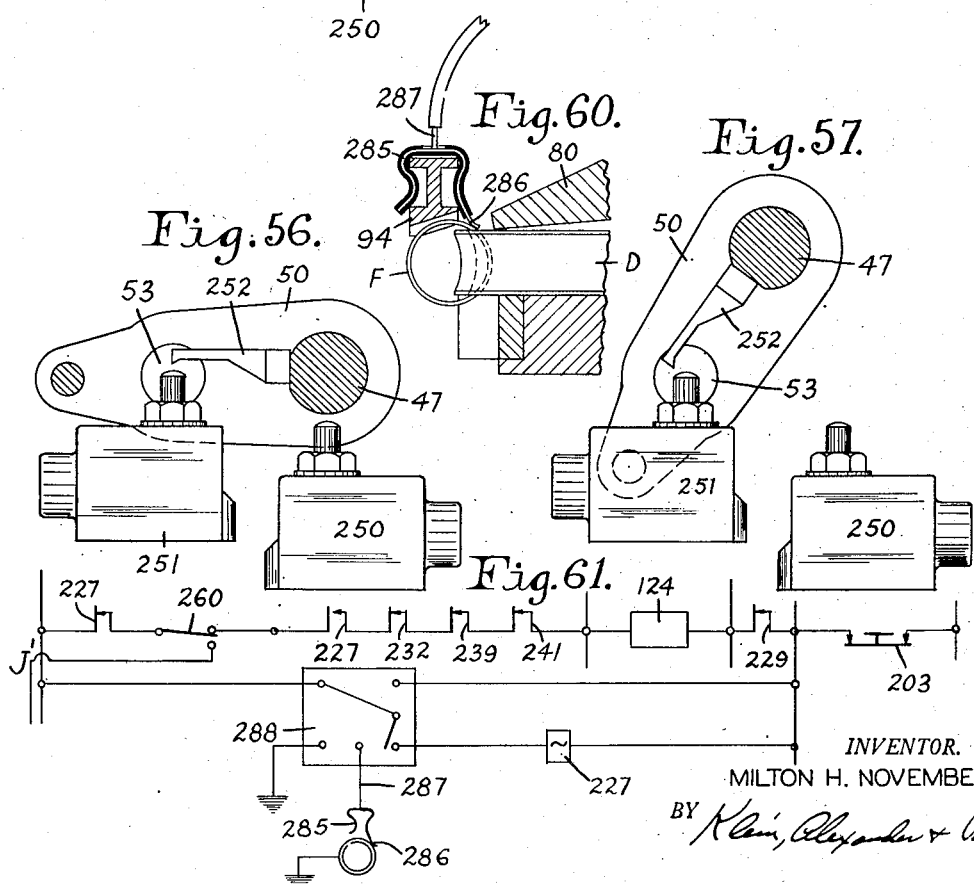

Patented Aug. 18, 1953

2,649,120

UNITED STATES PATENT OFFICE 2,649,120

MACHINE FOR BINDING BOOKS

Milton H. November, East Orange, N. J., assignor to Spiral Binding Company, Inc., New York, N. Y., a corporation of New York Application July 2, 1948, Serial No. 36,693

27 Claims. (Cl. 140—92.7)

This invention relates to machines for making books of the type in which a plurality of sheets are loosely bound together by means of a helically shaped binder.

Patent No. 2,300,544 issued to A. Freundlich, November 3, 1942, discloses a binding machine which accepts a book provided with a plurality of holes arranged in a row along the binding edge thereof for the reception of a helical wire binder and which is designed to shape the book so as to align the holes thereof into a substantially helical path by means of a hand operated carriage bearing a series of comb-like helically-shaped prongs, to clamp the book in its shaped condition during the binding operation, to form a wire into a helical shape and automatically feed it into the helically arranged holes of the book, to trim the portion of helical coil threaded through such holes to book size and to bend the ends of the trimmed helical coil so as to lock such coil in position on the book. While the machine of this patent was a long step forward in this art, and was highly desirable and effective for the purposes for which it was designed, it was not wholly automatic and was mechanically complex and bulky.

It is the principal purpose of this invention to provide a machine of the indicated type which is wholly automatic in performing its sequence of operations, which reduces the need for manual labor to a minimum and which at the same time, is capable of a higher rate of productivity than prior known machines of this type.

Another object of the invention is to provide a helical binding machine which is relatively simple and compact in construction and which is relatively inexpensive to construct and operate.

A further object of the invention is to provide an improved machine of the indicated type, which is relatively simple to operate, has a low maintenance cost and produces a better product more expeditiously and economically than prior machines of this type.

Other objects and advantages of the invention will be in part obvious and in part pointed out in the following detailed description of the machine, which should be read in connection with the accompanying drawings, in which Fig. 1 is a front elevational view of the machine of this invention with the top facing panel removed and the lower housing facing panel broken away to show the parts of the machine;

Fig. 4 is a top plan view of the machine;

Fig. 5 is a sectional view taken along the line 5—5 of Fig. 4;

Fig. 6 is a top plan view of the machine with the top frame casting and work table removed to show the mechanism within the upper housing more clearly;

Figure 15:
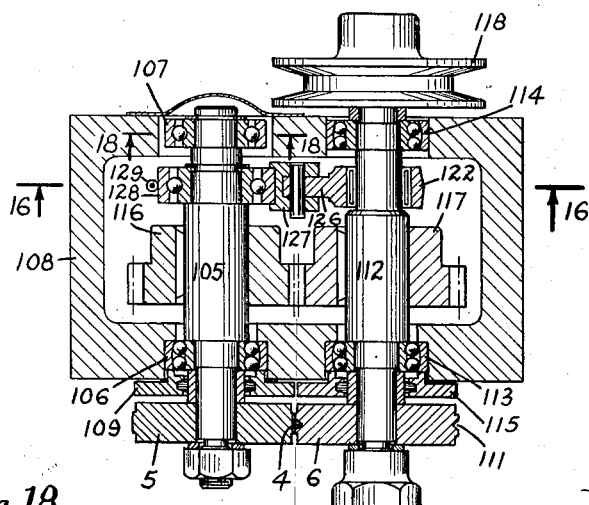
Figure 18:
Figure 16:
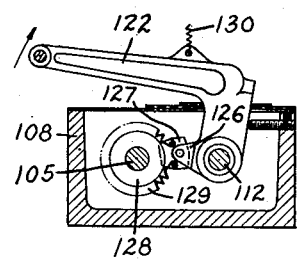
Figure 17:
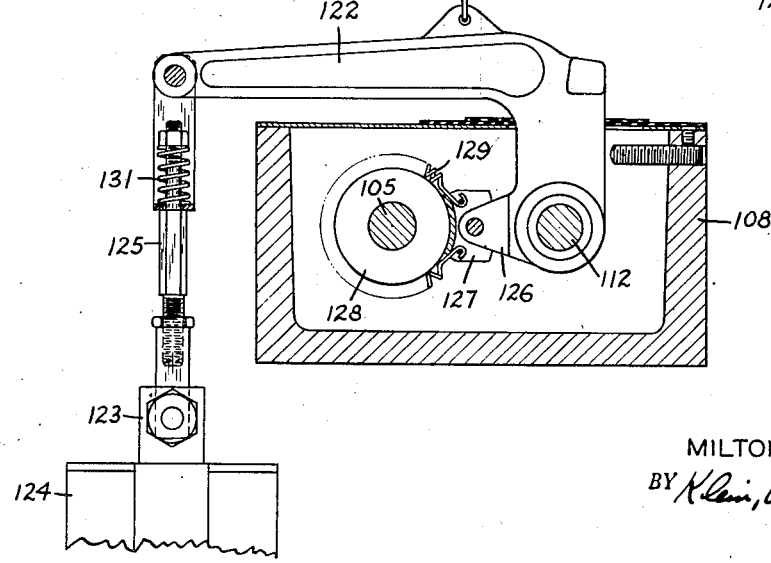
Figure 34:
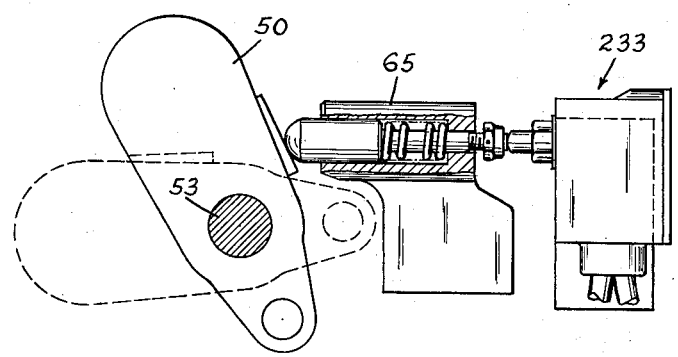
Figure 35:
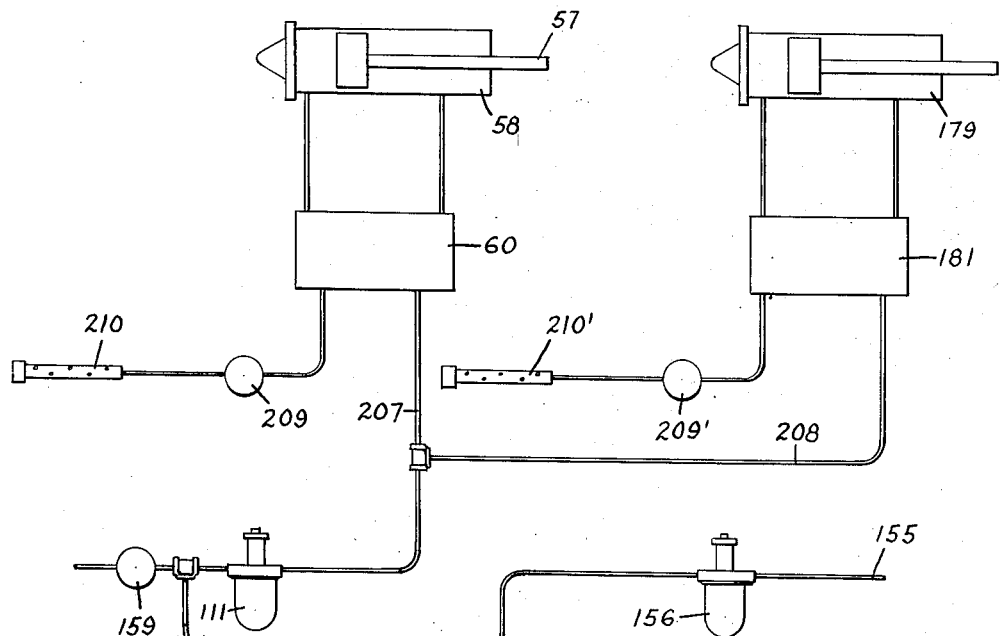
Figure 62:
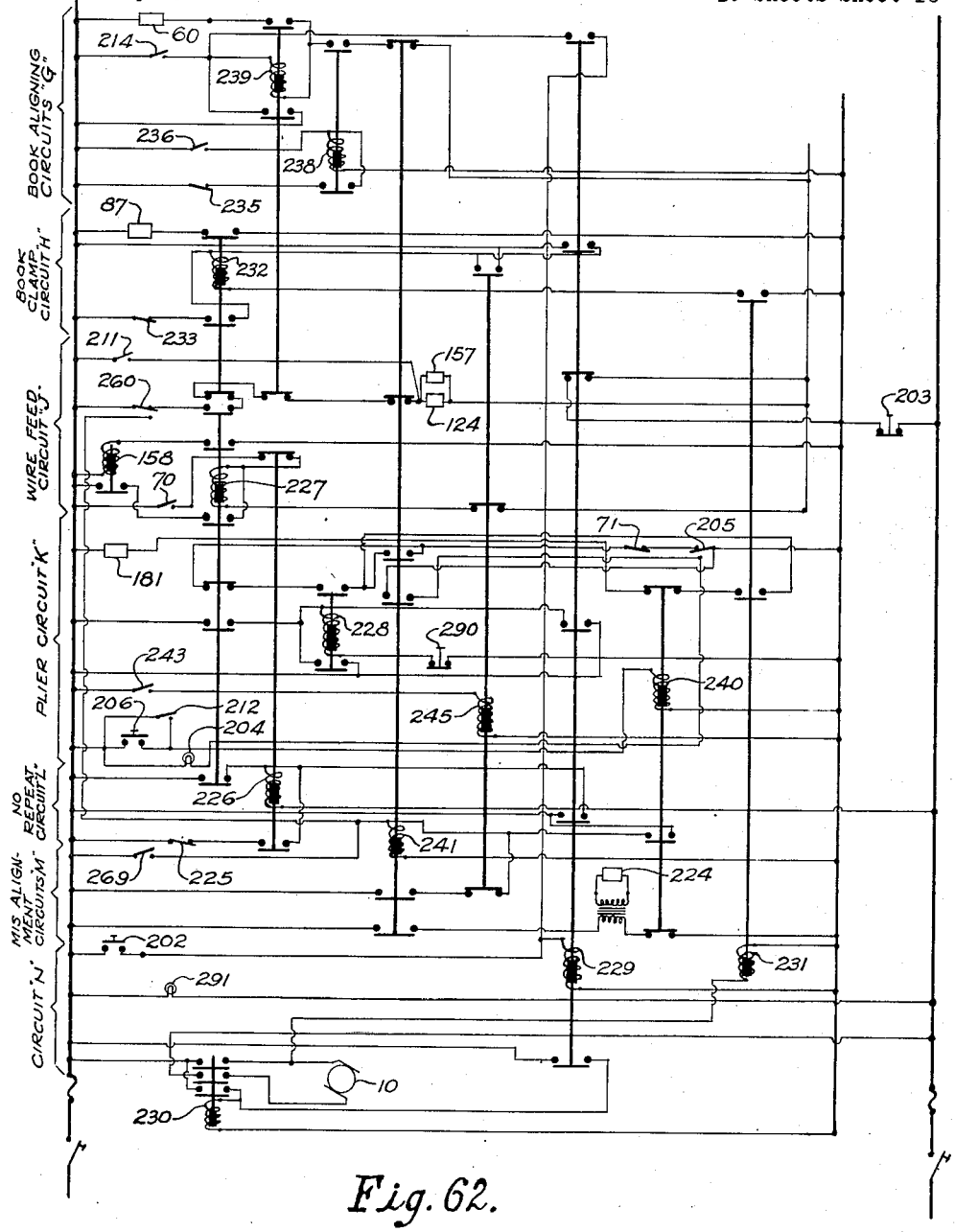

Fig. 7 is an enlarged, detailed, side elevational view, partly in section, of the upper portion of the machine, with certain parts eliminated, to show more clearly the arrangement of the book clamp, wire guide bar, book aligning prongs, pliers and actuating means therefor; the book clamp and book aligning prongs being shown in retracted position and the pliers being shown in a raised position ready for acceptance of an unbound book;

Fig. 8 is a similar view showing the pliers in lowered position, the book clamped to the table and the aligning prongs in fully advanced position within the book and ready to be retracted;

Fig. 9 is a similar view showing the aligning prongs removed from the clamped book and the wire guide in position on the coil being inserted, the pliers still being in lowered position;

Fig. 10 is a view similar to Fig. 8 and showing in an enlarged schematic form the relation of the pliers and aligning prongs, wire guide and clamp just prior to the removal of the aligning prongs from the book;

Fig. 11 is a vertical sectional view taken along the line 11—11 of Fig. 4 through the top frame casting of the machine and showing the table adjusting means for books of varying thicknesses;

Fig. 12 is a top plan view of the graduated scale and the table adjusting screw; such scale being calibrated in book thickness values;

Fig. 12a is a detailed front elevational view, partly in section, of the scale and the upper end of the table adjusting screw;

Fig. 13 is a schematic view showing the arrangement for driving the wire into the coiling die and the means for lubricating such die during the wire forming operation;

Fig. 14 is an enlarged vertical sectional view taken through the wire forming die shown in Fig. 13;

Fig. 15 is a horizontal sectional view of the wire feed mechanism, such view being taken along the line 15—15 of Fig. 13;

Fig. 16 is a vertical sectional view on a reduced scale of the wire feed mechanism shown in Fig. 15, such view being taken along the line 16—16 of Fig. 15 and illustrating the arrangement of the parts shown when such mechanism is in "wire disengaged" position;

Fig. 17 is a view similar to Fig. 16 on an enlarged scale and showing the relation of the parts of such mechanism when the latter is actuated to engage the wire through the wire feed rolls;

Fig. 18 is an enlarged detailed vertical sectional view taken along the line 18—18 of Fig. 15 and showing the rear mounting of the shaft bearing of the wire engaging shaft;

Fig. 19 is a top plan view of the wire forming die;

Fig. 20 is a side elevational view, partly in section, of such die;

Fig. 21 is a front elevational view, partly in section, of the die and showing the position of the pitch adjusting screw;

Fig. 22 is a longitudinal horizontal sectional view of a portion of the die mandrel on an enlarged scale and showing the relation of the wire coil to the pitch adjusting screw;

Fig. 23 is a front elevational view of the left hand plier unit showing the cutting knife in raised position prior to cutting the wire coil;

Fig. 24 is a side elevational view of the plier unit shown in Fig. 23;

Fig. 25 is a detailed elevational view showing the position of the cutting blade after having cut the wire and the cut end of the coil being bent to lock the binder in position on the book;

Fig. 26 is a front elevational view of the right hand plier unit of the machine;

Fig. 27 is a side elevational view of the right hand plier unit;

Fig. 28 is a detailed front view of the upper portion of the right hand plier unit and showing the position of the cutting blade prior to shearing the coil;

Fig. 29 is a similar view showing the relation of the parts after the coil has been sheared and the end of the coil bent;

Fig. 30 is an elevational view showing the switch actuating means for detecting a misalignment of the book in the machine and showing in solid and dotted outline, the range of movement of the switch actuating stylus in the normal alignment of a book being bound by the machine;

Fig. 31 is a top plan view of the book misalignment detecting switch shown in Fig. 30;

Fig. 32 is a broken view similar to Fig. 30, and showing the position of the switch actuating stylus when the book is misaligned, as shown in Fig. 32a;

Fig. 32a is a sectional view taken along the line 32a—32a of Fig. 4 and showing a misaligned book;

Fig. 33 is an elevational view of the anti-wire jam switch means;

Fig. 34 is an elevational view, partly in section, of the book aligning carriage shock absorber and the means for tripping the book clamp switch;

Fig. 35 is a schematic view of the pneumatic circuit of the machine;

Figs. 36 and 37 are across-the-line diagrams of the electrical control system of the machine;

Fig. 38 is a detailed broken view in front elevation, showing the helical coil emanating from the forming die and entering the book under the guidance of a guide bar;

Fig. 39 is a broken, side elevational view, partly in section, showing the relation of the wire guide bar and book clamp to the book, as the wire coil is fed through the latter;

Fig. 40 is a side elevational view of the switch tripping arrangement controlled by the book clamp plunger;

Fig. 41 is a side elevational view of the switch tripping arrangement controlled by the aligning finger carriage;

Fig. 42 is a side elevational view, partly in section, showing the switch tripping arrangement controlled from the plier bar shaft;

Fig. 43 is a broken front elevational view of an unbound book showing it in position against the side and back stops;

Fig. 44 is a side elevational view showing the book positioned against the side and back stops, the book being broken to show the side stop more clearly;

Fig. 45 is a detailed broken top view showing the rear end of the work table and the position of the aligning fingers when they first penetrate the book and prior to rotation of such fingers into the book;

Fig. 46 is a detailed side elevational view showing in dotted outline, the aligning fingers in fully retracted position, and showing in solid line, the position of such fingers when dropped into the book and before rotation of such fingers as in Fig. 45;

Fig. 47 is a detailed side view of the outer end of one of the aligning fingers;

Fig. 48 is a similar view showing such fingers in position on the book before rotation thereof as in Figs. 45 and 46;

Fig. 49 is a similar view showing the finger rotated within the binding aperture of the book and showing the book clamp in position on the book during such movement;

Fig. 50 is a view similar to Fig. 49 and showing the finger in partly retracted position while being removed from the book;

Fig. 51 is a view similar to Fig. 50 but illustrates the distortion of the book if the center of curvature of the finger is not displaced from the center of rotation of the carriage;

Fig. 52 is a partial front elevational view showing the aligning fingers in position on the book before rotation thereof, as in Fig. 45; the book being in vertical section to show the formed ends of such fingers more clearly;

Fig. 53 shows in diagrammatic form a circuit for an alternate embodiment of the book misaligning detection means;

Fig. 54 is a side elevational view of an alternate form of switch actuating means for detecting a misalignment of the book in the machine, such means being included in the circuit of Fig. 53;

Fig. 55 is a similar view showing the position of the parts of Fig. 53 when the aligning fingers have just penetrated the holes of a properly aligned book;

Fig. 56 is a similar view showing the arrangement of the parts when the fingers have failed to penetrate the book;

Fig. 57 is a similar view showing the arrangement of the parts as the carriage is further rotated when the aligning fingers have failed to fully penetrate the book;

Fig. 58 is a broken, detailed, vertical sectional view showing a modified form of die;

Fig. 59 is a sectional view taken along the line 59—59 of Fig. 58;

Fig. 60 is a vertical, sectional, detailed view showing another means whereby the length of the binding coil may be controlled;

Fig. 61 shows in diagrammatic form, a circuit for the means shown in Fig. 60 and whereby such control is exercised and Fig. 62 is a circuit diagram indicating the mechanical interrelation of the parts shown in Figs. 36 and 37.

It is believed that the disclosure of this invention will be more readily understood if a brief description of the normal operation of the disclosed binding machine is first given.

It might first be generally stated that the machine is designed to accept a book of unbound sheets having a line or series of prepunched holes along one edge thereof, and to form and insert through such holes, a helically coiled wire of proper diameter and pitch. The coil is controlled to proper length and after being inserted, is trimmed and the cut ends thereof folded to prevent its removal from the book of sheets bound thereby.

In the use of the machine, the operator first places the book of unbound sheets on the work table of the machine so that its rear perforated binding edge is placed against two back guides mounted directly on a pair of spaced wire cutting devices and so that one side edge of the book engages a side guide mounted on the work table. The book of sheets will thus be properly positioned and arranged in the machine for the binding operations to be performed thereon. Upon depressing the cycle start switch of the machine, a series of actions automatically takes place in the following sequence:

The wire cutting devices drop downwardly to retract the two back guides from the perforated edge of the book. A set of book aligning fingers then enter the holes in the book and cause them to assume a substantially helical path. The book is then clamped in this reformed condition and the aligning fingers are withdrawn from the holes. During this operation, a wire guide bar drops into position above the row of aligned holes in the book of sheets. The wire feed then comes into operation, causing the wire to be fed from a reel into a die which forms the wire into a helical coil of the desired form. From the die, the helical coil is driven directly into the helically aligned holes of the book. When sufficient wire has been formed to bind the book, the operation of the die is stopped and the wire cutting units are again raised into cutting position. These units are then actuated to trim the coil at both ends of the book and to turn the cut ends thereof inwardly in order to lock the helical wire in position on the book. The book is then unclamped, and the wire guide is raised to allow the bound book to be withdrawn from the machine.

Figure 1:
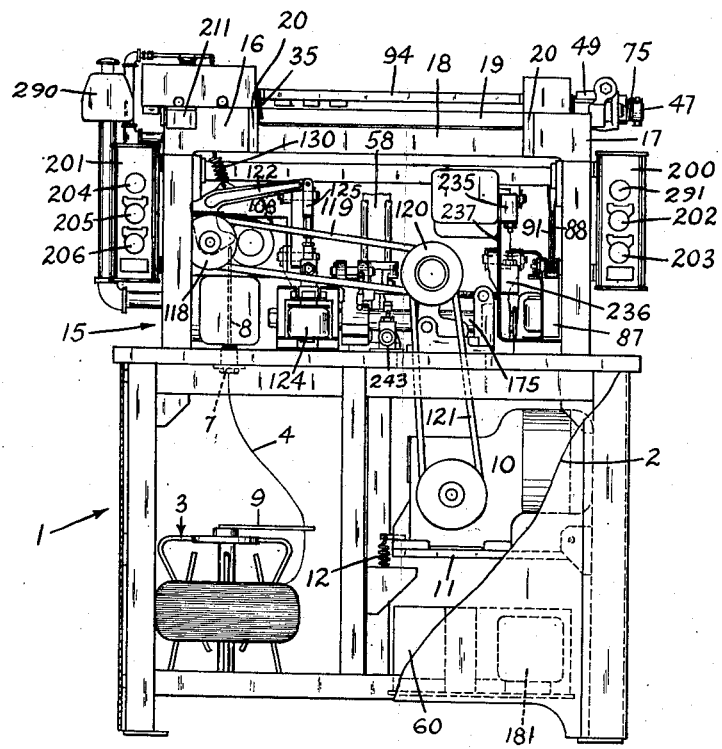
Figure 2:
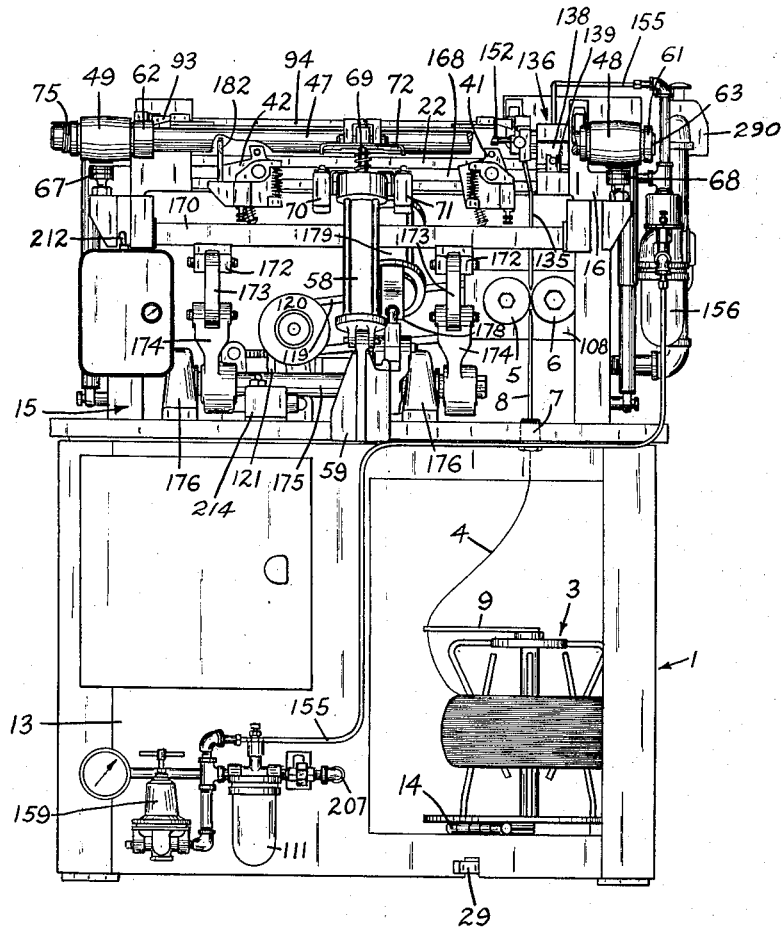
Fig. 2 is a rear elevational view of the machine.
Figure 3:
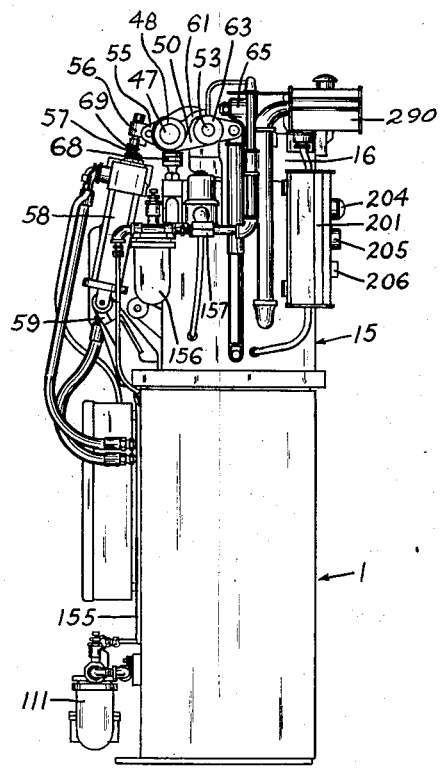
Fig. 3 is a side elevational view of the machine looking toward the left thereof, as viewed in Fig. 1 of the drawings.

Turning now to a detailed description of the machine, it will be noted in Figs. 1 to 3 of the drawings, that the machine is provided with a lower housing or base, which is indicated generally by the reference numeral 1, and which is normally wholly closed at the front of the machine by a facing panel 2. Contained within a compartment provided on one side of the lower housing 1, is a wire reel 3 which supplies the wire 4 from which the helical binders are made. The reel 3 is adapted to hold a considerable length of the wire, so as to provide a supply sufficient for the formation of a considerable number of helical binders. The wire is drawn from the reel 3 by means of a pair of feed rolls 5, 6. In its travel to the feed rolls 5, 6, the wire passes through a cup 7 which is filled with waste material to strip the wire of foreign matter, and then passes through a guide tube 8. The feeding of the wire from the reel 3 to the cup 7 is facilitated by an unreeling arm 9 pivoted on the reel 3 for free rotational movement about a vertical axis.

In a second compartment provided in the lower housing 1 is contained the motor 10 for driving the wire feed mechanism. The motor 10 is mounted on a platform 11 hingedly connected to one end of housing 1 and connected at its other end to a vibration absorbing unit 12 which also may be adjusted to regulate the tension on the motor belt. The rear of the motor compartment is closed by a panel 13, provided with an opening through which the reel 3 may be readily tilted for replenishment. It will be noted in Fig. 2 of the drawings, that the base of the reel 3 is pivotally connected to the base 1 of the machine by a hinge 14. Also connected to the base of reel 3 is a latching mechanism (not shown), which supports the reel when it is moved on its hinge to a tilted position in which it extends through the opening of panel 13. The latching mechanism is controlled by a foot actuatable lever 29 to permit the reel 3 to be returned to normal position in the housing.

Positioned upon the lower housing 1, is an upper housing 15 containing the wire feed mechanism and other instrumentalities, and being normally closed by a front cover panel (not shown). The top of the upper housing is closed by a top frame casting 18 provided with two end portions 16 and 17. Intermediate the end portions 16 and 17 and overlying the central portion of casting 18 is the work table 19 of the machine. Table 19 is pivotally supported by end portions 16 and 17 through a pair of pins 20 (note Figs. 1, 4 and 11), which project from the side forward ends of the table into bearing members (not shown) provided in such end portions. Thus, table 19 may be pivoted about its front edge portion along a line containing the longitudinal axes of the projecting pins 20. As is shown more clearly in Fig. 11 of the drawings, the rear edge portion of table 19 rests upon a plurality of spaced coiled springs 21 which are seated on a cross beam 22 and normally tend to support the rear end of the table in its uppermost position. The table 19 is provided with a centrally located opening 23 within which is positioned the head 24 of a tool actuatable adjusting unit and which is provided on its upper surface with an indicating member, such as the arrow shown in Fig. 12 of the drawings. The arrow on head 24 cooperates with an annular scale member or dial 28 seated in a recess provided on table 19 around hole 23 to indicate the adjustment of the table with relation to the center line of the helical coil binders which will be mounted on the books. The head 24 is integral with a threaded shank 25 which extends through an enlarged opening in a seating member 27 and through the casting 18 with which it is in threaded engagement. The seating member 27 is secured to the undersurface of table 19 and is provided with a tapered upper surface providing a knife edge which under the pressure exerted by springs 21, bears against the underside of a wear resistant washer 34 mounted on shank 25 intermediate head 24 and member 27. Positioned on shank 25, intermediate the casting 18 and a nut fixed on the lower end of such bolt, is a spring 26, to prevent the bolt 25 from inadvertently turning in plate 18 because of vibration.

It will be understood from the foregoing, that the rear edge portion of table 19 is normally urged upwardly by springs 21, but is restrained from moving beyond an adjusted position by means of head 24 of shank 25, which is adjustably anchored in casting 18. By turning shank 25 relative to casting 18 in one direction or the other, the table 19 is adjusted to a lowered or raised position to take care of books of varying thicknesses. The dial 28 is uniformly calibrated directly in book thickness values (note Fig. 12), so that the table 19 may be readily set for proper operation by adjusting the head 24 to point the arrow thereon to the book thickness on dial 28 corresponding to the thickness of the book to be bound. This uniform calibration is made possible by the knife edge rest on member 27 which assures accurate location of table displacement throughout the range of adjustment. The table 19 is provided along its rear edge with a comb 30 over which lies the perforated edge of the book D, as the latter is being bound. As is shown in Figs. 10, 11 and 45 of the drawings, comb 30 which is adjustably mounted on table 19, as by adjusting screws 31, is flush with the top surface of the table and is provided with a plurality of spaced grooves 32 having a width substantially equal to the diameter of the perforations in the book. The grooves 32 are disposed at an angle, such that the ends of the aligning fingers 33 can freely enter such gooves as they pass through the perforations E of the book D being bound. Preferably the adjustment of the comb 30 is made while the aligning fingers 33 are in their fully advanced position within the book D and such that the fingers are set to the center lines of the comb grooves 32.

The table 19 is also provided with a side gauge 35 for correctly positioning the book D on the table 19, so that the sets of apertures E in the pages thereof, will be in proper position to receive the aligning fingers 33 and to prevent any substantial resistance to the latter's passage therethrough. As is shown more clearly in Figs. 1 and 43 of the drawings, the side gauge 35 is inclined at an angle corresponding to the helix angle of the fingers 33 so that when a book is placed thereagainst, the pages thereof will be shifted sidewise a corresponding amount to dispose each set of apertures E in the pages at an angle substantially corresponding to the helix angle of the fingers 33. The side gauge 35 may be adjusted laterally to take care of books of varying sizes. The adjusting means, as is shown more clearly in Fig. 4 of the drawings, includes a block 36 secured in proper position on the end casting 16, and provided with a passageway through which extends a bolt 37, whose head is secured to gauge 35. Mounted on bolt 37 intermediate the head of the latter and block 36, is a spring which normally urges the head of bolt 37 away from block 36. Threadedly engaged with the end of bolt 37 and seated against block 36, is an adjusting nut 38. Thus, by varying the position of nut 38 on bolt 37, the position of side gauge 35 relative to table 19, may be adjusted. When a book D is presented to the machine, it is guided to approximate position, not only by side gauge 35, but by two additional back gauges 39 and 40 mounted on the wire cutting and bending units 41 and 42, respectively (note Figs. 2, 24 and 27). The back gauges 39 and 40 are straight pieces of metal set perpendicular to the binding edge of the book D and designed to orient the pages at that edge squarely in contrast to the side gauge 35 which arranges the pages of the book at an angle. This can best be seen by comparing Figs. 43 and 44 of the drawings.

The aligning carriage

The thus sidewisely inclined sets of apertures or perforations of the book D are formed into an arcuate or helical form by the aligning fingers 33 of the aligning carriage of the machine to facilitate the threading of the helical binder through such sets of apertures. As is shown more clearly in Fig. 45 of the drawings, the fingers 33 are formed in groups on a plurality of plates 45; the formation being such that when the plates 45 are placed side-by-side, the series of fingers as a whole, is unbroken. It will be understood however, that the plates 45 may be placed in spaced relation to provide spaced series of fingers 33 and the machine will operate equally effectively. The advantage of a continuous series of fingers is that all the holes in the book pages will be cleaned of any matter which might tend to affect the feed of the binder through such holes. The finger plates 45 are secured to an elongated supporting plate 46, so that the fingers 33 project from the front longitudinal edge of such plate 46. The rear longitudinal edge of plate 46 is secured in a longitudinal recess provided in a shaft 47. The ends of shaft 47 are rotatably supported by a pair of end bearings 48 and 49, provided on the rear ends of links 50 and 51, respectively, which are pivotally supported by aligned shaft members 53, 54, respectively, secured on the upper housing 15 by the shaft supporting members 52, 52 (note Figs. 3 and 4). Thus, shaft 47 is capable of rotatable movement about its own longitudinal axis, and is capable of being translated as a whole with its bearings 48 and 49 about an axial line containing the longitudinal axes of aligned members 53 and 54.

Secured to shaft 47, intermediate its ends, is a yoke member 55, which extends rearwardly from such shaft and is pivotally connected to a collar 56 secured to the upper end of the piston rod 57 of an air cylinder 58 (note Figs. 2 and 3). The lower end of the air cylinder 58 is pivotally mounted on a bracket 59 secured to the top of the lower housing 1. The air cylinder 58 is pneumatically connected to a four-way, solenoid operated valve 60 mounted in the lower housing beneath the motor 10 (note Fig. 1), and adapted to control the intake and exhaust of compressed air in such cylinder.

When the piston rod 57 of air cylinder 58 is in fully retracted position, shaft 47, by reason of its connection to such rod through yoke 55 and collar 56, will be positioned so that the aligning fingers 33 will be in a fully raised position, as is shown more clearly in Fig. 7 of the drawings. As the air in cylinder 58 advances the piston rod 57, shaft 47 will be caused to rotate about its longitudinal axis to move the fingers 33 towards the apertures in a book D positioned on table 19. The degree of rotation of shaft 47 on such advancement of piston rod 57 is limited to approximately 30 degrees, which is sufficient to cause the fingers 33 to enter into the book apertures a distance of approximately one-half the thickness of the book, as is shown in Fig. 48 of the drawings. This restriction on the rotation of shaft 47 is accomplished by means of two arms 61 and 62 secured to such shaft. As is shown in Figs. 4 and 5 of the drawings, arm 61 at the end of the thirty degree rotational movement of shaft 47 from the latter's fully retracted position, comes into engagement with the peripheral surface of a lead screw 63 secured to link 50, and threadedly engaged with the outer end of shaft 53. At the same time, arm 62 will come into engagement with the peripheral surface of a needle bearing 64 provided on the inner end of shaft member 54. Shaft 47 will thus be effectively locked against any further rotational movement about its own axis, and on further advancement of piston rod 57, will rotate with its bearings 48, 49 and links 50, 51, as a unit about an axis containing the longitudinal axes of shaft members 53, 54. Thus, as piston rod 57 advances from its fully retracted position, it will initially cause shaft 47 to rotate through an angle of approximately thirty degrees about its own axis and then cause shaft 47 to rotate about the longitudinal axes of shaft members 53, 54 (compare Figs. 7, 8 and 11).

During the initial rotation of shaft 47, the aligning fingers 33 will be caused to enter into the book apertures a distance of approximately one-half the thickness of the book, as has been previously mentioned. In the succeeding rotational movement of shaft 47 about the longitudinal axes of shaft members 53, 54, the aligning fingers 33 will be fully advanced through the apertures of the book. During this latter movement also, the lead screw 63 will turn on shaft member 53 to cause shaft 47, bearings 48 and 49 and links 50, 51 to be progressively shifted to the right on the shaft members 53, 54, as viewed in Fig. 4 of the drawings; an amount corresponding substantially to the pitch advance of the aligning fingers 33. The advantages of this construction are many. In the first place, such construction makes possible the use of a fixed side gauge because if the apertures of the book are properly aligned, the fingers will readily go through such apertures, while if the apertures are not accurately aligned, the pages of the book D will be shifted away from the side gauge as the fingers 33 pass therethrough. A further advantage of this arrangement is that as the fingers 33 are retracted in the operation of the machine, any possibility of substantial side thrust on the fingers 33 is eliminated. The elimination of such substantial side thrust reduces stress and wear on the fingers and possible marking or damage to the book. This latter result is also furthered by the fact that it makes possible the use of a clamp which bears relatively lightly on the book.

The shaft 47 and associated parts, are cushioned against shock at the end of their upward rotational movement by a pair of adjustable shock absorbing devices 65, 66 mounted on the end castings 16 and 17, respectively, and engageable with the links 50 and 51, respectively (note Fig. 4). Preferably, the spring pressed plungers of these devices (note Fig. 34) are so adjusted that the links 50 and 51 will engage and depress such plungers as the shaft 47 reaches the peak of its advancing rotational movement. When the piston rod 57 is retracted from its fully advanced position, the shaft 47, together with its bearings 48, 49 and links 50, 51, will rotate as a unit rearwardly and downwardly about the longitudinal axes of shaft members 53, 54 until the bearings 48, 49 engage the adjustable rests 67, 68, respectively (see Figs. 2 and 3). The rests 67, 68 are in the nature of cushioning members or bumpers, and function as supporting stops for the bearings 48, 49 and shaft 47, maintaining the latter so positioned, that on the initial rotative movement of such shaft about its own axis, the aligning fingers 33 will readily enter the apertures of the book. As the piston rod 57 continues its retractive movement, the shaft 47 will be rotated about its own axis to withdraw the aligning fingers 33 from the book. The piston rod 57 is provided with a shock absorbing spring member 69 with which the collar 56 on such rod engages, to cushion the end of the rotative movement of shaft 47. Because of the aforementioned cushioning members, the cycle of the aligning carriage, i. e., the entry of the fingers 33 thereof into the book, and the full retraction thereof, is accomplished at relatively high speed with negligible audible or visible evidence of impact shock at the extreme points of travel of the parts. This result is also made possible by means of a torsion spring 75 mounted on the right hand end of carriage shaft 47 (as viewed in Figs. 1 and 4). Spring 75 is mounted on shaft 47 so that it normally urges the fingers 33 carried by such shaft into the book. Thus when shaft 47 is rotated to move fingers 33 to a fully retracted position, energy becomes stored in spring 75. This stored energy is utilized in the next cycle of the machine to immediately cause shaft 47 to rotate to advance the fingers 33 as the piston 57 of air cylinder 58 is advanced, thus, obviating any tendency of such piston to raise shaft 47 during its initial movement rather than translating such initial movement of the piston into rotary movement of the shaft. When the fingers are returning from their fully advanced position in the book, spring 75 also makes possible the accomplishment of the change of rotational movement of the carriage about its center of rotation B (see Fig. 46) to a rotational movement of the shaft 47 about its axial center relatively smoothly and without any substantial shock to the carriage as the rotational movement about the center of rotation B terminates. Thus, torsion spring 75 makes possible smooth changes in the rotational movements of the carriage during the advancing and retracting movements of piston 57.

It will be noted in Fig. 2 of the drawings, that the upper end of the air cylinder 58 carries two switches 70 and 71, respectively, and that the yoke 55 carries a switch actuating member 72. Thus, as piston rod 57 returns to its fully retracted position, member 72 comes into engagement with switches 70 and 71, causing them to be actuated. Switch 70 controls the wire feed mechanism, and switch 71 is an interlocking switch controlling the operation of the machine, as will hereinafter be more fully understood.

Considering now the action of the aligning fingers 33 on the book D during the above described cycle of the book aligning carriage, it will be noted in Fig. 46 of the drawings, that during the initial, rotational movement of shaft 47, the fingers 33 will move from the dotted line position to the solid line position shown in such figure, about the longitudinal axis A of shaft 47. The configuration of the fingers 33 is such that at the end of an approximate thirty degree movement of shaft 47, the center of curvature C of the fingers 33 will be slightly spaced above (approximately 0.01 inch) the longitudinal axis B of the aligned shaft members 53, 54, about which the shaft 47 as a whole, rotates in its translatory movement (note Figs. 46 and 47). The position of the fingers 33 relative to the book D at the end of such thirty degree movement is shown in Fig. 48 of the drawings. As the shaft 47 starts its translatory movement about axis B, the fingers 33 are caused to penetrate completely the apertures E of the book (note Figs. 8 and 49). Due to the fact that the axis of rotation B of the carriage about the shaft members or pins 53, 54 and the center of curvature C of fingers 33 are not coincidental, the fingers 33 will have an eccentric motion about axis B during their movement from the position shown in solid lines in Fig. 46 to the fully advanced position shown in Fig. 49 of the drawings. As a result of this eccentric movement of the fingers 33, the outer surfaces thereof will engage the front portions of the aperture edges and push the pages of the book D forwardly away from axis B to the extent of the offset between axis B and the center of curvature C, as is shown in Fig. 49. Consequently, when the fingers 33 are rotated in a counter-clockwise direction for removal from the book, the outer surfaces of the fingers 33 will be immediately removed from contact with the pages of the book and the fingers will move freely out of the book apertures. There is thus eliminated the frictional resistance which would be created by the fingers 33 dragging the book D back in their retractive movement, if the axis of rotation B and center of curvature C were coincidental, as is shown in Fig. 51 of the drawings. The curvature of the aligning fingers 33 is determined by the maximum of a predetermined range of thickness of books to be aligned by such fingers for a binding operation. Thus, the fingers 33 will properly align the perforations of books having different thicknesses within a predetermined range and to be bound by binders of different diameters; the size of the binder in each case being dependent upon the thickness of the book actually being bound.

As will be seen more clearly in Figs. 45 and 52 of the drawings, the fingers 33 are also offset to approximately the same degree as the pitch of the coils in the helical binder to be inserted. Thus, when fingers 33 are moved through the apertures of the book during the above described translatory movement of shaft 47, such fingers will shape each set of successive perforations in the book pages, so that it defines a passageway which conforms in curvature to the curvature of the coils of the helical binder to be threaded therethrough. As will be noted in Fig. 52 of the drawings, the outer end of each finger 33 on the side on which it is advanced in a sidewise direction, during the translatory movement of shaft 47 due to the lead screw 63 is provided with a beveled edge portion 73 which facilitates the passage of such finger through the perforations in its advancing movement. During such advancing sidewise movement of the fingers 33, the edge portions 73 thereof, will bear against the edges of the perforations and push the book to the right if the gauge angle of the side gauge 35 is not as great as the angle of advance of the fingers 33. In such case, the book D will be moved to the right, as viewed in Fig. 52, away from side gauge 35, which is in a fixed position.

As the fingers are withdrawn from the book perforations at a rate similar to the helical advance provided in the contour of such fingers, there will be eliminated any sidewise thrust on the book during such retractive movement of the fingers. This also makes possible the use of a low pressure book clamp, thereby eliminating the possibility of marking the book, which would result if heavy clamping pressures were required to hold the book in its shaped form during the withdrawal of the fingers 33.

Book clamp

The book clamp 80 moves into clamping position when the aligning fingers 33 have reached the peak of their advanced movement and just prior to their return movement to a retractable position as is shown in Fig. 8 of the drawings. As can be seen more clearly in Figs. 4 and 9 of the drawings, the book clamp 80 is an elongated shoe having a length substantially equal to the width of the work table 19, and having a rear free edge which engages the book along a line located just forwardly of the row of apertures thereof. The front portion of clamp 80 is provided with a pair of longitudinally extending pins 81, 82 which are rotatably mounted in bearing units secured in position on the upper surfaces of the end castings 16 and 17 by strap members 83, 83. Adjustably connected to pin 82 as by means of an adjusting screw 84, is a clamp lever 85 which extends downwardly and forwardly through an opening in the end casting 17. The clamp lever 85 is substantially L-shaped, and its lower leg extends substantially horizontally towards the front end of the machine. The forward end of the horizontal leg of clamp lever 85 is connected to the core 86 of a solenoid 87 by means of a link 88. The inclined leg of clamp lever 85 supports intermediate its ends, one end of a spring 89 which is connected at its other end to a shoulder pin 90 secured to the casting end portion 17 and which normally tends to move the lever 85 in a counterclockwise direction, as viewed in Fig. 9, to bring the clamp 80 into engagement with a book on table 19. Fig. 9 shows the position of the aforesaid parts when the solenoid 87 is unenergized, and its core 86 is in a raised position. When solenoid 87 is energized, core 86 moves downwardly and through link 88, rotates the clamp lever 85 against the tension of spring 89, about the longitudinal axis of pins 82, 83 in a clockwise direction, thereby raising clamp 80 and releasing the book on table 19 from its clamping action. When the solenoid 87 is again deenergized, spring 89 will raise core 86 and through the clamping lever 85 and pin 82, will bring the clamp 80 down upon the book. It will thus be seen that the clamping pressure applied to a book by clamp 80 is spring controlled, and is only sufficient to maintain the pages of the book in proper position during the feed of the helical binder through the sets of apertures thereof.

Wire coil guide bar

It will be seen from Fig. 9 of the drawings, that there is also connected to the core 86 of the solenoid 87, a link 91 which is loosely connected at its upper end to one arm of a lever 92 rotatably mounted on pin 82. The other arm 93 of lever 92 is connected to one end of an elongated wire guide bar 94, which is supported at its other end by an arm 95 rotatably mounted on pin 81. Thus, when solenoid 87 is actuated, the core 86 of the latter, through link 91, will rotate lever 92 about pin 82 in a clockwise direction as viewed in Fig. 9 to raise its arm 93 and consequently guide bar 94 and arm 95. When solenoid 87 is disengaged, core 86 thereof, will be raised by spring 89, as has been explained, thereby permitting wire guide bar 94, arm 93 of lever 92 and arm 95 to drop of their own weight. This action may be facilitated by the aid of a torsion spring 96 connected to pin 82 and to the hub of lever 92 (see Fig. 4). As the wire guide bar 94 is released simultaneously with the actuation of book clamp 80 to a clamping position, the release of bar 94 takes place before the aligning fingers 33 have been withdrawn from the aperture of the book Consequently, bar 94 upon its release, will come to rest on the upper surface of such fingers, as is shown in Figs. 8 and 10 of the drawings. After the fingers 33 have been withdrawn from the book apertures, the wire guide bar drops into proper position over the binding edge of the book. This position is determined by a pair of adjustable stop screws 97 which extend in threaded relation through forwardly projecting supports 98 provided on bar 94, and engage the upper surface of the clamp 80 (note Figs. 4 and 39). As will be seen in Figs. 38 and 39, the wire guide bar 94 is grooved to conform in pitch with the helical binder. The functions of the bar 94 are to control the "coil whip" of the helical binder as it is being inserted into the book apertures at high speed, and to guide the helical binder into the book apertures as it is being fed from the binder forming die; the bar in this latter connection being particularly useful when the coil pitch of the binder varies, due to various forming conditions which may prevail.

*Wire feed mechanism*

As has previously been mentioned, the wire 4 from which the helical binders F are formed, is drawn from the reel 3 by a pair of feed rollers 5 and 6. Referring now to Figs. 15 through 18 of the drawings, it will be noted that feed roller 5 is secured to the reduced end of a shaft 105 rotatably mounted on anti-friction bearing devices 106 and 107. Bearing 106 is a self-aligning bearing that is secured in position in a recess provided in one wall of a housing 108 by means of a lock member 109. Bearing 107 is mounted in an enlarged opening 110 provided in an opposite wall of housing 108 and having the configuration shown in Fig. 18 of the drawings. Thus, bearing 107 is free to move transversely of shaft 105 within opening 110, thereby enabling shaft 105 to be pivoted on bearing 106 to a limited extent to move feed roller 5 toward or away from feed roller 6. The peripheral surface of feed roller 5 is a plain cylindrical surface, while feed roller 6 is provided in its peripheral surface with a V-shaped groove 111 within which rides the wire 4. Thus, the feed rolls 5 and 6 depend for the required gripping action to feed the wire, on the V-shaped groove 111 of roller 6 and the cylindrical surface of roll 5. Feed roll 6 is mounted on the reduced end of a shaft 112 supported for rotatable movement about a fixed axis by the bearing units 113 and 114. Bearing unit 113 is secured in position in a recess provided in one wall of housing 108 by means of a lock member 115, while bearing unit 114 is secured in an opening in the opposed wall of housing 108 and to shaft 112. The shafts 105 and 112 are connected together by gears 116, 117 respectively. Rotative motion is furnished to shafts 116, 117 through said gears and a sheave 118 mounted on shaft 112 and connected by a belt 119 to a variable pitch sheave 120 rotatably mounted in the upper housing 15 (see Fig. 1). Sheave 120 is connected to motor 10 by means of a belt 121. This driving arrangement permits the speed of rotation of shafts 105 and 112 and consequently feed rollers 5 and 6 to be considerably varied to enable the wire 4 to be fed at widely varying rates.

It will be understood from the foregoing, that feed rollers 5 and 6 are continuously rotating during the operation of the machine, but whether they are operative to feed the wire 4 depends upon the pressure of roll 5 on such wire. The means for controlling the feeding action of the rolls 5 and 6 includes a lever 122 which is pivotally mounted on shaft 112 and has one arm connected to the core 123 of a solenoid 124 through an adjustable link 125. The other arm 126 of lever 122 pivotally supports a clutch member or shoe 127 which bears against the outer race of a bearing 128 mounted on shaft 105. The clutch shoe 127 is maintained in engagement with bearing 128 by means of a coiled spring 129 which is connected at its ends to such shoe and which is wrapped around the outer race of bearing 128 under tension. A spring 130 is connected to the solenoid actuated arm of lever 122 and to the end casting 16 of the upper housing (note Fig. 1). The arrangement of the parts is such that spring 129 normally maintains lever 122 in a raised position, as shown in Fig. 16 of the drawings. With lever 122 and its arm 126 in a raised position, shaft 105 is pivoted about its bearing 106 to hold feed roll 5 in a retracted position with relation to feed roll 6. When the solenoid 124 is energized, its core 123 and link 125 will be moved downwardly, thus pivoting lever 122 in a counter-clockwise direction, as viewed in Fig. 17 and thereby causing lever arm 126, through shoe 127 and bearing 128, to pivot shaft 105 about its bearing 106 to advance feed roll 5 toward feed roll 6. Figs. 15 and 17 show the positions of the parts when the solenoid 124 has been actuated, with the feed roll 5 bearing on wire 4 and cooperating with feed roll 6 to feed such wire. When solenoid 124 is deenergized, spring 130 moves lever 122 in a clockwise direction to lift core 123 and break the toggle connection between lever arm 126, clutch member 127 and bearing 128, thereby withdrawing feed roll 5 from feed roll 6. The parts are so adjusted that a movement of roll 5 of only .005 inch is necessary to cause such roll to engage or disengage the wire 4 and consequently, to feed or interrupt the feed of the latter, respectively.

It will be noted that the toggle connection between lever 122 and shaft 105 is relatively simple, anti-friction, of low inertia construction, thereby permitting rapid engagement and disengagement of such parts with minimum time lag and free of sticking. This construction therefore, provides the needed requirements for accurate control of wire feed and instantaneous interruption in the wire feed in the event that a helical binder becomes jammed during its passage through the apertures of the book. As will hereinafter become more clear, the jamming of a binder in a book due either to its striking an obstruction or becoming in any way impeded to a perfectly free entry in the book holes, is manifested by an expansion of the helical coil on the die mandrel. This characteristic of the wire to expand under such conditions is utilized to control the operation of a sensitive limit switch which in turn controls solenoid 124. Actual tests have shown the system to be so sensitive that clutch disengagement can be accomplished almost immediately from the instant the limit switch is tripped until the solenoid 124 releases its pressure on the lever 122 and pressure feed roll 5. In fact, it has been found possible to interrupt a jam before permanent distortion takes place in the wire coil. The pressure of feed roll 5 on the wire 4 can be controlled by adjusting the compression of a spring 131 on the adjustable link 125. The pressure of roll 5 must be adequate to drive the wire through the forming die without slippage, but must not be so great as to deform the wire from its round shape, as the latter will result in erratic pitch behavior of the coil emanating from the die.

Wire coil die

The wire 4 is driven by feed rolls 5 and 6 up through a guide tube 135 and into a coiling die 136 under compression (note Figs. 2 and 13). Referring now to Figs. 13 through 22 of the drawings, it will be seen that the coiling die 136 comprises a horizontally disposed, annularly-shaped body member 137 which is adjustably mounted on a die holder block 138. The die holder 138 is supported on a bracket member 139, and may be adjusted relative to the latter by an adjusting screw 140. Mounted on the projecting end of the body member 137 is a bracket member 141 provided with a pair of shoulders on which are mounted a semi-circular die cap 142. Secured to the legs of the bracket member 141 beneath the cap 142 is a member 143 provided with a passageway 144 into whose lower enlarged end extends the upper end of the guide tube 135. The upper or discharge end of passageway 144 which underlies the die cap 142 is in alignment with one side portion of a helical or spiral groove provided on an intermediate portion 145 of a mandrel whose shank or cylindrically-shaped end portion 146 is secured in position in the body member 137. The helical groove in mandrel portion 145 has a pitch equal to that of the helical binder to be formed from the wire 4. It will be noted that guide tube 135 and passageway 144 are disposed at an angle slightly under the helix angle of the groove in portion 145. This arrangement enables the wire 4 to be formed with greater ease into a helical shape and eliminates shaving of the wire at its point of entry on the mandrel, thereby preventing possible erratic pitch behavior of the coil F being formed from such wire that might otherwise result from shaving the wire.

As the wire is forced under compression from passageway 144 into the die, the grooved mandrel portion 145 and die cap 142 cooperate to form the wire into a helical shape; the groove of portion 145 feeding the wire upon a cylindrically-shaped projecting portion 147 of the mandrel. Just prior to the discharge of the coiled wire on to mandrel portion 147, the wire is corrected for variations in pitch due to wire "spring back" by means of a conical point pitch adjusting screw 148 threadedly extending through a block 149 mounted on the bracket member 141. The conical point of screw 148 extends into a conically-shaped recess 150 provided at the juncture of the outer end of the mandrel portion 145 with mandrel portion 147 and in communication with the outer end of the spiral groove formed in such portion 145. Fig. 22 shows more clearly the manner in which the adjusting screw 148 coacts with the wire to stretch the coil to its final pitch. The emanating coil F is supported by a ball bearing support or guide 151 mounted on member 143 before contacting the pitch adjusting screw 148 to effectively control the length of arc over which the pitch adjusting screw will allow active pitch correction or wire deformation to take place.

After passing over the cylindrically-shaped projecting portion 147 of the mandrel, the coiled wire F enters into a groove formed in an enlarged nozzle or pilot 152 provided on the outer end of the mandrel. The nozzle 152 guides and supports the helically-formed wire F to the place where it will be threaded into the first set of apertures in the book. As is shown more clearly in Figs. 14 and 38 of the drawings, the wire leaving the forward end of the nozzle 152 passes around the top end of the book and then downwardly into the first set of perforations along the binding edge of the book.

Wire coil die lubrication

During the formation of the wire 4 into a helical shape, provision is made for adequate, consistent lubrication of the wire in the die. This is accomplished by providing the shank portion 146 of the mandrel with a longitudinally extending flattened surface portion, so that a longitudinally extending chamber 153 is formed between such portion and the body portion 137 of the die (note Fig. 14). Chamber 153 at its discharge end communicates with an annular chamber enclosing the grooved portion 145 of the mandrel. At its other end, chamber 153 is in communication with a passageway 154 formed in the die body portion 137. In communication with passageway 154 is a tube 155 which passes through a conventional compressed air lubricating bowl 156 and which is connected to a source of air pressure through a pressure reducer 159 (note Figs. 13 and 35). Bowl 156 contains a suitable liquid lubricant such as a 7 to 1 solution of water soluble oil, and as the air passes therethrough, it is loaded with a fog of such lubricant. As is shown in Fig. 13 of the drawings, the flow of air and lubricant to the die 136 is controlled by a solenoid operated valve 157 wired in parallel to the wire feed clutch solenoid 124. It will thus be seen that by this means, oil laden air is delivered to the die 136 only during the wire forming cycle of the binding operation. This continuous flow of a fog of lubricant and compressed air to the die during the wire forming operation, has been found by practical operation to result in many advantages. In the first place, it has been found to substantially extend the life of the die beyond that capable of being attained with the use of other known lubricating systems. This is probably due to the fact that it not only lessens the wear of the wire on the die, but also purges the die of any foreign matter which might otherwise tend to accumulate therein. The fog of lubricant also prevents abrasion of the wire or damage to its coating in the forming section, which is necessary if a coil of consistent, uniform pitch is to be maintained. It also functions as a cooling agent to maintain the temperature of the wire and die at low levels, thereby permitting the wire to be passed through the die at relatively high speed with minimum wear of the latter. As the fog of lubricant applies a uniform coating on the wire, any tendency of the book becoming stained by such lubricant, is minimized.

Wire length control and plier units

The length of wire feed per book bound, is controlled by means of an electronic time delay relay 158 (note Figs. 36 and 62), which controls the period of time that the wire feed solenoid 124 is energized, and since the motor 10 runs at a substantially constant rate of speed, the timing period is equivalent to lengths of formed coil required for a book of given size. Accuracy of repetition of coil lengths is assured by the non-slipping action of the feed rolls 5 and 6 on the wire, the positive, almost instantaneous engagement and disengagement of such feed rolls due to the low inertia and freedom of sticking of the feed roll clutch mechanism, and the high accuracy of timing repetition of the relay 158. As has previously been mentioned, the forming rate of the wire can be varied by adjustment of the variable pitch sheave 120 connected between the driving motor 10 and the sheave 118 mounted on shaft 112 of feed roll 6.

When a sufficient length of wire has been fed to provide a complete helical binder, the plier units 41, 42 come into operation to cut the portion of wire threaded in the perforations of the book to its proper length and to bend the ends thereof so as to lock such binder in place on the book. Before proceeding with a description of the plier units, it might at this time be well to point out that the nozzle 152 of the die mandrel is cut away at its outer ends to provide a space into which the plier unit 41 may enter to perform its operations. The cut-away portion of nozzle 152 can best be seen in Figs. 14 and 38 of the drawings, and the relationship of such nozzle with plier unit 41 can best be seen in Fig. 2 of the drawings.

The two plier units 41 and 42 are substantially similar in construction, except for the cutting and bending mechanism thereof. Consequently, similar reference numerals have been applied to similar parts in both units in order to facilitate the understanding of the construction of such units. Referring now to Figs. 23 through 29 of the drawings, the plier units include a body portion 165 having on its forward face a dove-tailed slot within which is slidably mounted a dove-tail shaped block 166. The slot in body portion 165 and block 166 incline from the vertical at an angle corresponding to the pitch angle of the helical wire formed by the die 136 (note Figs. 23 and 26). Provided on block 166 is a T-shaped slide block portion 167 which is slidably mounted in a longitudinally extending T-shaped guideway 168 formed in the rear side of the cross beam 22 attached to the rear edge of the table bed plate 18 (note Figs. 2, and 7 to 9 of the drawings). Thus, the cutting units 41 and 42 may be shifted lengthwise of the table 19 to take care of helical binders of different lengths, while the body portions 165 thereof may be slidably moved in an inclined transverse direction on the dove-tail blocks 166, the angle of inclination of blocks 166 making possible the easy entry of the wire cutting and bending elements mounted on such body portion 165 around the coil to be cut and bent. The upwardly inclined movement of the body portions of such units to bring the cutting and bending elements carried thereby into operative relation with the helical binder threaded into the book, is brought about by the vertical movement of a slide bar or shelf 170 upon which such body portions rest through a spring-loaded plunger 171. As is shown more clearly in Figs. 2, 7 and 8 of the drawings, the shelf or slide bar 170 is mounted on a pair of spaced blocks 172, 172. Each block 172 is pivotally connected to the upper end of a link 173 which is pivotally connected at its lower end to an arm 174 secured to a shaft 175. Shaft 175 is rotatably supported at its ends by a pair of bearing units 176, 176 mounted on the top plate of the lower housing 1. Also connected to shaft 175 is an arm 177 which is pivotally connected to the end of a piston rod 178 of an air cylinder 179. The air cylinder 179 inclines upwardly and forwardly from the end of arm 177 and is pivotally supported at its upper end by a bracket 180 secured to the under surface of the top frame casting, 13.

The movement of piston 178 of air cylinder 179 is controlled through a solenoid-operated four-way valve 181 (note Figs. 35, 36 and 62), and is such that when rod 178 is fully retracted, the plier units are raised with the back stops 39 and 40 thereof in position ready to receive an unbound book (note Fig. 7). Upon starting the cycle of operations of the machine, air is furnished to air cylinder 179 to cause piston 178 to move to a fully advanced position. During the advancing movement of piston 178, shaft 175, through arm 177, is caused to rotate in a counterclockwise manner, as viewed in Figs. 7 and 8, thereby causing arms 174, 174 to rotate in a similar direction. The initial rotation of arm 174, 174 causes shelf 170 to be raised until the pivotal connection of arms 174 and links 173 pass a line connecting the center of rotation of shaft 175 and the pivotal points between links 173 and blocks 172. From this point on, shelf 170 will be lowered to bring the plier units to a lowered position; the positions of the parts at the end of such advancing movement of piston 178 being shown in Fig. 8 of the drawings. As has been previously mentioned, the wire-forming cycle is timed to provide in the book, a helical coil of proper size. When such timed wire-forming cycle is ended, the piston 178 is moved back into the air cylinder 179. During this return movement of piston 178, arm 177, shaft 175 and arms 174 are rotated in a clockwise direction to cause links 173 to raise the slide bar 170 and consequently to raise the plier units 41 and 42 into cutting position. It will be noted from Figs. 2, 23 and 26 of the drawings, that the plier units 41, 42 are provided with stop members 182, 182 which engage with fixed portions of the machine to arrest the upward movement of such plier units when the latter have reached their proper cutting elevation. The slide bar 170 however, continues its upward travel to a maximum elevation. The difference in the upward movement of the slide bar 170 from the elevation at which the plier units were arrested in their vertical travel to the peak of travel of such slide bar, is utilized to actuate the cutter blades of the plier units. The cutter blades travel through an arc shearing the wire and bending the coil ends inwardly as will hereinafter appear more clearly. As the piston rod 178 continues to be drawn into the cylinder, the pivotal connections between arms 174 and links 173 pass dead center and the slide bar 170 drops a distance sufficient to restore the cutting blades of the plier units to a normal position, thus freeing them from contact with the wire and enabling the bound book to be withdrawn from the machine. The plier units 41 and 42 at the end of this cycle therefore still remain supported by the slide bar 170 in a raised position, such as to enable the stops 39 and 40 thereof to serve as back stops for the next book to be bound. As has previously been explained, the stops 39 and 40 will drop out of book-engaging position only after the next book to be bound has been inserted and the cycle starting button of the machine has been depressed.

It will be evident from the foregoing, that the plier units 41 and 42 are double acting, in that a single unidirectional movement of the slide bar 170 upwardly places such units in cutting position and actuates them to cut and bend the ends of the coil threaded through the book being bound. During the initial upward movement of the slide bar 170, and until the upward movement of the plier units 41 and 42 is arrested by the stops, such units are lifted by the slide bar through the spring-loaded plungers 171 thereof. When the upward movement of the plier units is arrested, the spring-pressed plungers 171 thereof, are depressed, allowing a second downwardly projecting plunger 186 on each unit, to contact the slide bar 170. Thus, as the slide bar 170 continues its upward travel during the time that the plier units 41 and 42 are prevented from partaking of such movement, the plungers 186 will be forced upwardly by such slide bar. The upper ends of plungers 186 are in engagement with one arm of rockers 187, 187' provided on units 41, and 42, respectively. Rockers 187, 187' are each provided with an integral shaft portion 188 extending through an aperture in the body portion 165 of its associated unit and rotatably supported in such aperture. The other arms of rockers 187, 187' are normally maintained in an uppermost position by means of springs 189. Thus, springs 189 through rockers 187, 187' normally tend to maintain plungers 186 extended, and yieldingly resist upward movement of such plungers by the slide bar 170. Adjustably secured to the shaft portions 188 of rockers 187, 187' are cutting blades 190, 190', respectively.

Referring now to Figs. 23 to 25 of the drawings, which show details of the left hand plier units 41, it will be noted that the arrangement is such that rocker 187 rotates in a clockwise direction when plunger 186 is actuated by the slide bar 170. During such rotational movement of rocker 187, the movable cutting blade 190 moves below a pair of parallelly-arranged obliquely disposed members 192, 193 mounted on the upper portion of the body portion 165 of the plier unit 41, so that they pass on either side of one coil of the helical binder in the upward movement of such body portion. The upper ends of members 192, 193 are beveled to permit the ready access of the coil between such members and the latter are spaced apart a distance slightly in excess of the diameter of the wire so that the wire coil fits readily therebetween, without any excess play. At the end of the upward movement of the body 165 of the plier unit, the two members 192, 193 straddle the coil at the top portion thereof with the bottom ends of such members positioned just above the axial center of the helical binder. Positioned directly below member 192 and fixedly secured to the body 165 of the plier unit is the stationary cutting blade 194 of the unit. As will be seen more clearly in Fig. 23 of the drawings, in the aforesaid position of the parts, the movable blade 190 and member 192 are in alignment, while the fixed cutting blade 194 and member 193 are in alignment with each other. Thus, when the rocker 187 is actuated by plunger 186, blade 190 moves out of alignment with member 192 and passes between member 193 and the fixed cutting blade 194, to sever the coil positioned between members 192 and 193 at a point spaced below member 193 (note Fig. 24). As the blade 190 continues its movement between the fixed blade 194 and member 193, the portion of the wire coil immediately above the point of severance is bent about the lower end of member 193, so that it extends inwardly of the adjacent coils of the binder substantially along the axial center of the latter, as is shown more clearly in Fig. 25 of the drawings.

The cutting mechanism of the right hand plier unit 42 is similar to that of the left hand plier unit 41, except that the cutting and bending devices are reversed, with the two guide and bending members positioned below the cutting members and their positions interchanged with respect to the body 165 of unit 42. Thus, as shown in Figs. 26 and 27 of the drawings, the guide and bending members 192', 193' of unit 42 correspond to members 192, 193 respectively, of unit 41, but unlike the latter, are positioned below the cutting members 190', 194' which correspond to the cutting members 190, 194, respectively, of unit 41. In unit 42, also, the arrangement of the parts is such, that the rocker 187' and consequently the movable cutting blade 190' move in a counterclockwise manner, as viewed in Fig. 26 of the drawings, when actuated by the plunger 186 of such unit. The coil of wire positioned between such members will therefore be cut and bent in a direction directly opposed to the direction the wire is bent, by unit 41, so that at the end of the cutting and bending operations, the two bent ends of the helical binder will be positioned within the ends of such binder, and will extend towards each other. The plungers 186 which actuate such cutting and bending operations of the units 41, 42, are provided with adjusting screws 195 at their lower ends to control the length of the stroke of such plungers.

*Operation of machine*

The cycle of operations of the above described mechanism is controlled by a relay panel remotely connected to the machine proper. This relay panel consists of eleven control relays with multiple contacts and one motor starting relay. These relays are energized from limit switches actuated by the working mechanical components of the machine and from interlocking arrangements between the control relays themselves. It is believed that the operation of such relays can best be understood by first considering the functions of the several mechanisms of the machine and their control of the limit switches during the normal operation of the machine.

At the instant that air pressure and electrical power is applied to the dormant machine, the condition of the machine is as follows: The aligning carriage air cylinder 58 is retracted with limit switches 70 and 71 on such cylinder, closing and opening, respectively. A limit switch 225 (note Fig. 41) which in such condition of cylinder 58 is free from contact with the aligning finger plate 46, is released and thereby also closed. The plier bar 170 will be in its lower position with the associated limit switch 243 released by its actuating arm 213 and thereby open, and with the associated limit switch 214 engaged by its actuating arm 242 and thus closed (note Figs. 7 and 42). The book clamp solenoid 87 will be de-energized so that the book clamp 80 is down. Consequently, the limit switches 235 and 236 controlled by such solenoid will be tripped and open, and released and open, respectively (note Figs. 9 and 40).

When the start button 292 (note Fig. 1) of the machine is pressed the book clamp solenoid 87 will be energized, thus raising the book clamp 80, releasing limit switch 235 causing it to close and actuating switch 236 to close it. Simultaneously the plier bar 170 is caused to raise, thus releasing limit switch 214 to cause it to open and closing limit switch 243.

When the cycle start switch 290 (note Fig. 1) is opened by momentarily pushing in its finger button, the plier units 40, 41 and plier bar 170 will drop, releasing limit switch 243, causing it to again open and closing switch 214. As a result of the closing of switch 214, the book aligning action is started, the advancement of the air cylinder piston 57 during such action causing the release of limit switches 70 and 71 and permitting them to open and close, respectively. The advancement of the finger plate 46 will also trip switch 225 causing it to open. At the peak of the advancing movement of the aligning fingers 33 a limit switch 233 is tripped and opened by link 50 of the aligning carriage depressing the plunger on shock absorber 65 (note Fig. 34). The opening of switch 233 causes the deenergization of the book clamp solenoid 87, thereby causing the clamp 80 to clamp the book to the work table; the limit switch 236 to be released and thereby opened, and limit switch 235 to be tripped to an open condition. At this point in the cycle of the machine, the aligning fingers 33 start to retract. As the aligning fingers return to their retracted position, limit switch 225 is released by finger plate 46 thereby closing. When the fingers 33 are fully retracted, the limit switches 70 and 71 on the aligning carriage air cylinder 58 will be tripped and closed and opened, respectively. The tripping of limit switch 71 opens the plier circuit, thereby readying this circuit to raise the plier units 40 and 41 through bar 170 after the wire coil F is fed to the book. The closing of limit switch 70 initiates the wire feed action for the duration of a timed cycle controlled by the electrical time delay relay 158. After completion of the timed wire feed period, the relay 158 interrupts or deenergizes a multi-contact control relay 227, thereby causing the plier circuit to be energized and consequently causing the plier units 40 and 41 to be raised through bar 170 to their cutting position. In the course of the movement of the plier bar 170, limit switch 214 will be released or opened. At the end of the plier bar movement, limit switch 243 will be tripped or closed. With the closing of switch 243, the book clamp solenoid 87 is energized to cause the raising of the book clamp 80 to release the bound book. The actuation of the solenoid 87 causes the release of limit switch 235 and the tripping of switch 236 as has been previously described.

It will be observed in Fig. 1 of the drawings, that the machine is provided with two control boxes 200, 201. Control box 200 is provided with a start button 202 which when pressed, energizes the machine to prepare it for the binding cycle and a stop button 203 which when pressed, renders the machine inoperative to perform its functions. Above start button 202 is a green light 291 which indicates whether or not power is on the relay panel before button 202 is pressed. Control box 201 is used for setting up purposes and also for clearing the machine when adjusting wire pitch and removing jammed coils. Thus, box 201 is provided with a red pilot light 204 which when illuminated, indicates that the book being bound is misaligned, or that there is a wire jam. Beneath pilot light 204 is a selector switch 205 which has two positions. In one position of switch 205, the machine is enabled to continue its several functions automatically. When switch 205 is actuated to its other position, the automatic binding cycle is interrupted at the termination of the timed wire period so as to enable the operator to make any wire length and plier setting and wire guide bar adjustments as may be necessary to a proper operation of the machine. Thus, in setting up the machine before going on automatic cycle, the operator by use of such other position of switch 205 is enabled to permit a book D to be aligned, clamped and a binder F inserted in the clamped book, whereupon the cycle will be interrupted at this point and the machine will remain inoperative while the operator checks the cutting units on the pliers and the wire feed and makes whatever adjustments may be required with respect to the wire guide bar, the length of wire coil fed and the plier setting. When these adjustments have been made and switch 205 turned back or restored to its first mentioned or automatic position, the plier units will be raised and the machine will resume and complete its normal cycle of operations. The button 206 on box 201 is pushed when it is desired to drop the plier bar for checking the cutting action of the pliers, or for any other reason for which it might be desired to operate the pliers independently on the machine. When it is desired to run a length of wire out to check its pitch, this can be accomplished by first depressing button 206 to lower the plier units and then pressing the button on switch 211. During the time the button of switch 211 is depressed, coiled wire will be fed from the die. When button 206 is then released, the plier units will be raised and will cut off the length of wire which it is desired to examine. Should it be desired to maintain the plier units in a lowered position for an appreciable time, this can be accomplished by operating a toggle switch 212. The plier units will remain lowered until toggle switch 212 is returned to its normal position.

In readying the machine for its cycle of operations, a knife switch (not shown) is closed to furnish electrical energy to the machine, and a valve (not shown) is actuated to furnish compressed air to the finger carriage air cylinder 58, the plier unit air cylinder 179 and the die 136. As is shown in Fig. 35 of the drawings, the entering compressed air passes through a pressure reducer 159 and then through pipe 155 to die 136 and through pipes 207 and 208 to valves 60 and 181, which control the flow of air to the air cylinders 58 and 179, respectively. Air is exhausted into the atmosphere from air cylinder 58 through valve 60, a speed control needle valve 209 and muffler 210. In a similar manner, air is exhausted into the atmosphere from air cylinder 179 through valve 181, a speed control needle valve 209' and muffler 210'. A lubricator 111 is preferably placed in line 207 to furnish lubricant to valves 60 and 181, and air cylinders 58 and 179. With the actuation of the knife switch, the solenoid valves 60 and 181 are conditioned to cause air cylinder 58 to retract and to cause air cylinder 179 to be extended. The extension of air cylinder 179 as has been expalined, brings the plier units 41, 42 to a lowered position. In this condition of the air cylinder 179 also, a spring contact finger 213 on shaft 175 will be in engagement with, and hold closed, a switch 214 which when closed, normally renders operative the circuit G controlling the finger carriage aligning cycle (note Figs. 8, 36, 41, 42 and 62). With air cylinder 58 in retracted position, the finger carriage will be fully retracted and switches 70 and 71 will be closed, as has been explained. Switch 70 controls the wire feed circuit J and when closed, renders such circuit operative to start the wire feed cycle. Switch 71 is contained in the plier unit circuit K, and serves as a safety interlocking switch, maintaining such circuit inoperative until the finger carriage is fully retracted. Thus, unless air cylinder 58 and consequently the finger carriage are fully retracted, the plier unit circuit K will not be rendered operative to enable the plier units 41 and 42 to be raised to cutting position. The retraction of the finger carriage leaves switch 225 mounted on the upper housing 15 free from engagement with finger plate 46 of such carriage and thus in a closed condition. Switch 225 functions as a locking device in circuit L, permitting the wire to feed but one "timed length" for each machine cycle. The closing of switch 225 maintains operative control relay 226 in the wire feed circuit J.

When switch 70 is closed, control relay 227 is rendered operative, thereby causing the time relay 158 in the wire start circuit J to become energized for one cycle. After a period of time corresponding to such cycle has elapsed, the timer contacts 158T open, thus causing relay 227 to open and time delay relay 158 to become deenergized. The closing of control relay 227 also interlocks with the plier solenoid 181 to maintain the air cylinder 179 advanced, and the slide bar 170 in its lowered position. The closing of relay 227 however, closes control relay 228 in the plier unit circuit K, thus readying this circuit for the cutting and binding operation. The closing of relay 227 also energizes the wire feed solenoid 124 and causes the wire lubricator valve 157 to open, thus readying the wire feed mechanism to feed wire to the die 136. No wire will be fed to the die at this stage however, since the motor 10 is not running.

With the machine readied (air pressure and electrical power to control panel) in the manner above described, the operator pushes start button 202 which momentary contact causes a multi-independent contact control relay 229 included in the several circuits to close, and hold momentarily through switch 214 until the plier units raise. This prevents the aligning carriage from operating, should button 202 be released before switch 214. During this period, the several circuits are rendered operative to condition the various mechanisms for the binding cycle. Thus, the motor start relay 230 in circuit N is energized to cause motor 10 to start. With the starting of motor 10, control relay 231 in such circuit closes, thus readying the circuit H including control relay 232 and the plier circuit K containing the solenoid valve 181. Control relay 232 is held closed by switch 233 which is controlled by the finger carriage shock absorber 65, as is shown more clearly in Figs. 4 and 34 of the drawings. The closing of relay 232 causes the book clamp solenoid 87 to become energized, thus causing such solenoid through link 88 and lever 85, to raise the book clamp 80 and guide bar 94 in the manner previously described. Connected to the core 86 of solenoid 87, is a contact finger 234 which moves between a pair of vertically-disposed switches 235, 236 supported by a bracket 237 mounted on a side wall of the upper housing 15 (note Figs. 1, 9 and 40). Thus, as the book clamp 80 is raised, finger 234 moves out of engagement with switch 235, allowing it to close and moves into engagement with the button of switch 236, closing the latter. The closing of switch 236 operates a control relay 238 in the finger circuit G and holds the same closed through switch 235 which readies control relay 239 in such circuit.

During the momentary closing of relay 229, the finger and wire feed circuits G and J are also opened, thus maintaining the aligning fingers 45 in a retracted position and solenoid 124 inoperative to feed wire. When the start button 202 is released and switch 214 opens when the pliers are raised, relay 229 opens, placing the book aligning circuit, book clamp and wire feed circuits G, H and J in condition for the start of the normal binding cycle. The closing of relay 229 also closes relay 228 which is held in closed position by the switch 290, the latter of which is actuated by the operator to start the binding cycle (not Fig. 1). With the closing of relay 228, the plier solenoid 181 is energized, thus causing the air cylinder 179 to raise the plier units 41 and 42, so that the back stops 39 and 40, respectively, will be in proper position to receive a book to be bound. As the plier units 41, 42 are raised, switch 214 opens, and then switch 243 is closed. The closing of switch 243 causes relay 245 to be energized and a control relay 241 to open, thus resetting the finger, wire start and plier unit circuits G, J and K, respectively, thus readying them for the binding cycle when the cycle start switch 290 is actuated. The closing of relay 229 also causes relay 226 to close and thereby open relay 227, if the latter has not previously been opened by the time contacts of relay 158. When relay 226 is closed, it is held closed through switch 225 until released by the finger plate 46 in the book aligning advancing movement of the finger 33.

With the several contacts and mechanisms of the machine conditioned as aforesaid, the machine is now ready to receive a book to be bound. The operator places the book of unbound sheets on the table 19, so that its rear perforated binding edge is placed up against the two back stops 39 and 40 of the plier units 41 and 42, respectively, and so that one side edge of the book is placed against side guide member or gauge 35. The book of sheets will thus be positioned on table 19, so that the apertures thereof, will be enabled to readily receive the ends of the aligning fingers 33, as they are advanced. The operator then depresses the button on the start switch 290 to start the normal binding cycle of the machine. When switch 290 is thus opened (normally closed contacts), relay 228 opens, thus opening circuit K containing the solenoid valve 181. With the deenergization of valve 181, the piston 178 of air cylinder 179 moves to a retracted position, thus lowering the plier units 41, 42, and removing their back stops 39 and 40, respectively, from engagement with the rear of the book. Associated with spring contact finger 213 on shaft 175, is a spring contact finger 242, which controls a switch 243 (see Fig. 42); the arrangement being such that when the piston of air cylinder 179 is in a retracted position with the plier units raised, finger 242 will depress the button of switch 243 to close the latter (see Fig. 7), while when the piston of air cylinder 179 is in an advanced position and the plier units lowered, switch 243 will be released and open. The opening of switch 243 opens a control relay 245 in the book clamp, wire start and misalignment circuits H, J and M, respectively. The opening of control relay 245 readies the book clamp circuit H for release of the clamp after the book is bound, readies the wire feed circuit J for the book to be bound and readies the misalignment and wire jam circuits M. Contrariwise, the advancement of the air cylinder 179 to lower the plier units, causes the contact finger 213 to engage with its associated switch 214 and close the latter. The closing of switch 214 causes control relay 239 to close, thereby energizing the solenoid 60 controlling the operation of the finger carriage air cylinder 58. As has been previously described, during the energization of solenoid valve 60, the piston 57 of air cylinder 58 is advanced to cause the aligning fingers 45 to align the pages of the book, so that their sets of apertures are changed from an angular to an arcuate form. During such energization of solenoid valve 60, switch 71 is opened to interlock the plier solenoid valve 181 to prevent the pliers from coming up and engaging the aligning fingers while the latter are in the book which would smash the mechanism, and switch 70 is opened to ready the wire feed circuit J. The plates 46 during the advancing movement of the fingers 33 cause switch 225 to open, which in turn causes control relay 226 to open, thereby placing the wire feed circuit J in a condition in which it will be ready to cause the feed of one length of coiled wire, as soon as switch 70 is again closed.

As a result of the energization of solenoid valve 60 also, switch 233 is opened, thereby causing control relay 232 to open and thereby deenergizing the book clamp solenoid 87 to permit the clamp 80 to be brought into clamping position on the book. The opening of solenoid 87 causes switch 235 to open, thereby opening control relay 238 and the finger solenoid valve 60. The deenergization of solenoid 60 results in the retraction of the piston of air cylinder 58 and consequently of the aligning fingers 33. As the plate 46 on which the fingers 33 are mounted is retracted, switch 225 is allowed to close, thereby closing control relay 226 to condition the wire feed circuit J to feed one "timed length" of the coiled wire. When the piston of air cylinder 58 has reached a fully retracted position, switch 71 is closed to ready the plier circuit K, and switch 70 is closed, causing control relay 227 to close and hold through the timer 158. With the closing of relay 227, the timer 158 is energized, whereby the timer contacts remain closed for the timed interval. At the same time, the wire feed solenoid 124 is energized to cause the wire to be fed through the die for the timed period, and to cause the wire lubricating valve 157 to open and lubricate the wire fed through the die. The closing of relay 227 also opens the plier solenoid circuit K with the pliers in a lowered condition, and causes control relay 226 to close and hold closed through switch 225. In other words, the closing of relay 226 interlocks switch 70 and thereby permits one wire feed cycle even though such switch remains closed for the remainder of the binding cycle; switch 70 being held inoperative to relay 227 by switch 225 and relay 226 after the timed period and until the next binding cycle. At this time, relay 227 closes control relay 228, thereby readying plier circuit K to energize solenoid 181, when relay 227 is deenergized at the completion of timed period.

When the contacts of relay 158 open at the end of the timed interval, control relay 227 opens, thus causing the timer to reset, the wire feed solenoid 124 to open and thus terminate the feed of the wire, and the wire lubricating valve 157 to close. The opening of control relay 227 also causes the plier solenoid 181 to be energized and through air cylinder 179 causes the plier units 41 and 42 to be raised and to cut and bend the coil in the manner previously described. After their cutting and bending operations, the plier units 41 and 42 will remain raised with their stop bars 39 and 40 in proper position for the next cycle. The raising of plier units 41 and 42 also opens switch 214 and relay 239, thereby readying the aligning finger circuit G for the next cycle.

Following the opening of switch 214, switch 243 closes, thus energizing control relays 245 and 232 and interlocks control relay 227 in the case of an abnormal binding cycle to be described later, and opens control relay 241. The closing of control relay 232 causes the book clamp solenoid 87 to become energized, thus moving the book clamp 80 away from the book. The release of the book clamp causes switch 235 to be released or closed and switch 236 to be closed, thus closing control relay 238 and thereby readying the aligning finger circuit G for the next cycle. Similarly the opening of control relay 241 readies the wire feed solenoid 246 for the next binding cycle.

The foregoing describes the normal operation of the machine. Safeguards however, are provided which will interrupt the normal binding cycle when the book is not properly presented to the machine, or when the coil, during its feed, becomes jammed for some reason. When a book of sheets to be bound, is not properly in position on table 19 for the binding operation, the aligning fingers 33 will either fail to properly register with the holes in the book, or fail to penetrate through the book when such fingers are advanced to conform the sets of holes to a substantially helical arc. This condition is translated into a motion which causes a switch to be tripped and through an arrangement in the circuits of the machine, the tripping of such switch will abbreviate the normal binding cycle. The switch mechanism for accomplishing this purpose is shown in Figs. 30 to 32 of the drawings, and includes a switch 269 which is controlled by a stylus 252 mounted on shaft 47 of the aligning finger carriage. The stylus 252' is secured on shaft 47 so that its switch engaging tip will rotate about a point contained in dotted line 253—253 (note Fig. 32) as the aligning carriage rotates as a unit during the advancement of the aligning fingers 33 in the normal operation of the machine. The end of stylus 252' will therefore rotate in the fashion shown in Fig. 30 of the drawings without actuating switch member 266. When however the aligning fingers 33 fail to enter the apertures of the book (see Fig. 32a) or fail to completely penetrate the book apertures, the aligning carriage will be displaced from its usual center of rotation, thus causing the end of stylus 252' to move toward the switch member 266 and depress the same (see Fig. 32). Member 266 is pivotally supported at its upper end by a transverse pin 267 mounted on the legs of a U-shaped bracket 268 secured to switch housing 269. The free end of member 266 is held in its normal position by means of a spring 270. Member 266 carries a spring pressed plunger 271 which when member 266 is depressed by stylus 252', presses the contact pin of switch 269. The actuation of switch 269 causes the energization of relay 241 in the manner previously described, to stop the cycle of movement of the machine and withdraw the aligning fingers 33. Switch 269 is mounted on a support 272 secured to end casting portion 16 and may be adjusted for sensitivity relative to such support by the adjusting means 273.

It will be understood from the foregoing, that in the case of a misaligned book, the aligning movement of the fingers 33 will be arrested as the result of the tripping of limit switch 269. This causes the fingers 33 to retract immediately. Limit switch 269 through control relay 241 also prevents the feed of wire to the misaligned book when the retracting piston of cylinder 58 reaches its point of travel where switches 70 and 71 will be engaged, as has been previously described. Thus, the plier bar 170 raises the plier units 41 and 42 into cutting position and as a result of such operation, limit switch 214 is released and limit switch 243 is closed in the manner described with regard to the normal cycle.

In the case of a wire jam, the wire feed initiated from limit switch 70 is interrupted by a limit switch 260. The closing of switch 260 also causes the energizing of control relay 241 previously mentioned in the description of the misalignment sequence, thus causing the plier units 41 and 42 to immediately be raised into cutting position. Control relay 241 also energizes a buzzer warning signal 224 and red pilot light 204 to indicate a jammed condition. As the pliers are raised to trim the defectively bound book, limit switch 214 is released and limit switch 243 is closed, as was previously described. Limit switch 243 energizes control relay 245 whose function is to energize the book clamp circuit H to release the book and to deenergize control relay 241, thus deenergizing the buzzer and the red pilot light 204.

The above described operations are accomplished by taking advantage of the fact that when, during the insertion of the wire coil into the formed apertures of the book, the coil becomes obstructed or jammed for any reason, it expands in a radial direction over its entire length, due to the feed of such wire through the die. This expansion of the coil on the mandrel portion 147 of the die is utilized to trip switch 260 to stop the further feed of the wire. As is shown in Figs. 4 and 33, the means for accomplishing this includes a pin 255 slidably mounted in an annular housing 256 secured to the upper surface of the end portion 16 of the top frame casting 18 of the machine. The outer end of pin 255 is provided with a button 257 which yieldingly engages with the formed helical wire F passing outwardly over the mandrel portion 147 of the die. The inner end of pin 255 engages with the lower end of a depending member 258 which is pivotally supported by the legs of a U-shaped bracket 259 mounted on a micro-switch 260. Provided on member 258 is a spring pressed plunger 261 whose head engages the contacting pin of switch 260 and maintains such member engaged with the end of pin 255. The switch 260 is adjustably carried by a support 262 mounted on the end casting 16. Adjustment of the switch 260 relative to its support 262 in order to vary the sensitivity of the operation of the switch is made through the rotatable adjusting means 263. It will thus be seen that as soon as the wire coil expands in a radial direction due to the coil becoming jammed in its feed through the book, such expansion is translated into a linear motion by pin 255 and member 258 to actuate switch 260. Switch 260 is also in the circuit containing control relay 241 and when it is actuated by the wire coil being jammed, causes the energization of relay 241 as has previously been described.

It will be understood from the foregoing, that as soon as either switch 269 or switch 260 is closed, the wire feed solenoid 124 is opened, thus immediately interrupting the wire feed sequence and closing the wire lubricating valve 157. Simultaneously, the cutting plier units 41, 42 are moved upwardly to trim the defective coiled portion that has been fed from the die mandrel. The book is then unclamped as in the normal binding cycle, thus permitting the operator to remove the imperfectly bound book from the machine. The actuation of the said switches also closes the circuits for a buzzer 224 and the red light 204 which remain on until switch 269 is opened and switch 243 is closed. The wire feed solenoid 124 will remain open until the operator starts a new binding cycle by the interlocking action of control relay 245 in the circuit of relay 227. The energization of control relay 241 by switch 269 will also cause the aligning finger solenoid 131 to actuate the air cylinder 179 to retract the fingers 33. With the retraction of fingers 33, switch 269 opens and switches 70, 71 and 225 are closed, as has been previously described, to ready the mechanism for a new binding cycle.

By keeping the rate of wire forming within certain limits and by adjusting the anti-jam switch 260 closely enough, it is possible to interrupt the wire feed rapidly enough so that the expanded coil on the die mandrel portion 147 will be restored to its previous undistorted shape, since the spring of the coil takes place within the limit of elasticity of the wire and before taking a permanent set. Such control enables the binding of the next book to proceed immediately without requiring the time consuming procedure of removing the distorted coil end from the die mandrel.

From the foregoing description of the operation of the machine, it will be noted that the electrical control circuit possesses unique features of its own. In the first place, it is constituted of commercially available components of tried service durability and consequently, will operate for long periods of time without requiring any servicing. With regard to the wire feed circuit, its uniqueness resides in an arrangement in which a system of relays allows but one coil length to be formed for each book bound, even though the limit switch 70 which starts the wire feed, is closed or depressed by the retraction of the aligning carriage air cylinder 58 for a period greater than the wire inserting timed period. A further advantage of this circuit arrangement is that it provides a simple, effective means for rejecting improperly bound books and also prevents the attempted insertion of the wire coil into an improperly aligned book. By the use of a series of limit switches properly disposed and actuatable at spaced points, the various movements of the machine parts provide the proper sequencing impulses to be translated to the control panel, so that no independent sequence control device is required. In this connection, electrical interlocks are used exclusively to prevent the possible interference between mechanisms that normally occupy the same relative space, but at different periods of an operating cycle. For instance, the plier bar 170 will not be raised until the fingers 33 are in a retracted position and until wire has stopped feeding. Also, the fingers will not enter into aligning position until the plier units 41 and 42 are in lowered position. Furthermore, the wire coil F will not feed into a book D until the book is aligned, the plier units 41 and 42 are in a lowered position, and the path through the book is entirely free and unobstructed to the passage of the wire coil F therethrough. Also by reason of the spaced arrangement of switches 235 and 236, the finger mechanism will not retract until a normally aligned book is first firmly clamped on the work table.

By providing an interlock on relay 229 through the limit switch 214, it is made impossible for the aligning motion to take place prematurely when the machine is being made ready for such operation and even though in such condition of the machine, switch 214 is closed and would therefore normally cause the aligning carriage to start its aligning motion. Interlocking relay 231 with contacts located in both the book clamp circuit and the plier circuit, acts as a safety to make sure that the machine will not go through an aligning cycle even if the stop button contacts are only opened momentarily. The time lag inherent in the four-way solenoid valves 60 and 181 and in the air cylinder 179 of the plier bar 170 sometimes exceeds the duration of the opening of the momentary stop button contact 203. Consequently, control relay 232 would be reenergized through switch 243 and relay 245 as soon as the button contact 203 was closed. Under these conditions, the book clamp would remain in raised position and when the plier units 41, 42 moved to a lowered position and limit switch 214 was actuated, the aligning cycle would start and the whole machine would then proceed to execute one cycle. However, since interlocking relay 231 is held in closed position continuously by the motor starting relay 230, the instant the stop button 203 is pressed and its contacts opened, the motor starting relay 230 and limit switch 71 open, thus preventing any accidental recycling of the machine irrespective of the short period of actuation of such stop button. Similarly, the interlocking hold circuit of control relay 229 through the limit switch 214 prevents the accidental cycling of the machine when the motor start button 202 is rapidly depressed and released before the time in which the plier cylinder 179 is enabled to act to release the contact on limit switch 214. It will thus be seen that this arrangement obviates any possibility of an accidental cycling of the machine, which might otherwise occur if the time of actuating in the start or stop buttons is less than the time required by the hydraulic system to disengage switches 214 or 243.

While I have hereinabove described and illustrated a preferred form of the machine, it will be evident to those skilled in the art that various modifications and changes may be made therein, without departing from the spirit of the invention. Thus, instead of using switch 269 to terminate the normal binding cycle by failure of the fingers 33 to properly penetrate and align the pages of the book, the same result can be accomplished with the use of a pair of switches, such as shown in Figs. 53 to 56 of the drawings. The arrangement shown in such figures includes a switch 250 which is controlled by the shaft 47 of the finger carriage, and a switch 251 which is controlled by a stylus finger 252 mounted on shaft 47 and whose switch actuating outer end is coincidental with the center of rotation B of the carriage (note Fig. 47). As is shown in Fig. 53 of the drawings, switches 250, 251 are in series and control the operation of relay 241; the arrangement being such that in the normal book aligning cycle, either of the two switches will keep the circuit containing relay 241 open and inoperative. Thus, when the aligning carriage and fingers 33 are in their retracted position (note Figs. 46 and 54), switch 250 will be tripped and therefore opened by shaft 47, while switch 251 will be released and therefore closed. When in the normal operation of the machine, the aligning fingers have been advanced to the point where they have just penetrated the holes in the book (see Fig. 50), both switches 250 and 251 will be tripped and therefore opened, which is the condition shown in Figs. 52 and 55 of the drawings. As the fingers 33 continue to advance through the holes in the book about the center of carriage rotation B (see Fig. 49), shaft 47 will be raised, thus releasing switch 250 and allowing it to close, but stylus 252 during such rotational movement of the carriage, will maintain switch 251 tripped and open. Should however, the condition arise where the aligning fingers 33 fail to penetrate the holes of the book and instead, rest on the top thereof during the rotational movement of the carriage as a unit (note Fig. 32a), the carriage instead of rotating about the normal center of rotation B, will rotate about the ends of fingers 33 as a pivot, thus releasing both switches 250 and 251 (see Fig. 56). The closing of both switches 250 and 251 will cause relay 241 to become energized. A similar condition results when the fingers 33 in their advancing movement initially have penetrated approximately one-half the book, as shown in Fig. 48, but when the aligning carriage as a unit, starts its rotating movement, such fingers will fail to penetrate the entire book as in the normal manner shown in Fig. 49 of the drawings. This condition also causes the aligning finger carriage to rotate about a center other than center B, and such that both switches 250 and 251 are released as shown in Fig. 57 of the drawings, with the consequent energization of relay 241. In either case, the energization of relay 241 interrupts the normal bending cycle of the machine in the manner which has been previously described.

Instead of lubricating the die 136 in the manner previously described, the die may be lubricated by having the fog of lubricant pass from the passage 154 directly into a transverse passageway 275 provided in the mandrel portion 146' and communicating with a bore 276 provided in such mandrel and extending longitudinally through portions 146' and 145' of the same (note Fig. 58). In portion 145' of the mandrel are provided a plurality of radially extending passageways 277, which communicate with bore 276 and have their ends discharge into the spiral groove 278 of such portion in the region of the entry of the wire into such groove (note Fig. 59). Thus, the fog of lubricant is delivered directly to the wire at the section of the wire where it is undergoing forming pressure and is therefore most effective.

In Figs. 60 and 61 of the drawings, is shown an alternative means for controlling the length of wire coil binder F. The electronic time delay relay 158 in the wire circuit J under normal operating conditions does not give a coil length control of better than plus or minus one-half a coil. While this control is entirely satisfactory for normal operations, there are certain binding conditions where a more precise control of the length of the binder is necessary. This is accomplished by utilizing instead of the time relay 158, a contactor 286 fastened to the wire guide bar 94 so as to engage with the feeding wire coil at some predetermined point thereof. The contactor 286 is covered with an insulating material 285 so that it is insulated from the guide bar 94 and has an offset contact point lying in the path of feed of the coils of the binder F. The contactor 286 is connected by means of a wire conductor 287 to an electronic relay 288 contained in the wire circuit J'; the arrangement being such that when the coil F engages the contactor 286, a low voltage current flows to the electronic relay 288 where the impulse activates a relay which action is arranged to deenergize the wire feed solenoid 124. By properly predetermining the position of the contactor 286 on the guide bar 94 and its point of contact along the coil F, it has been found possible to achieve a control of coil length within plus or minus one-eighth of a coil at a relatively fast rate of feed of the coil F through the book being bound.

I claim:

1. In apparatus for binding books with helical binders comprising a table arranged to receive a book provided with a row of apertures along the edge thereof to be bound, means for rearranging the pages of the book on the table so that the apertures thereof substantially conform in curvature to the coils of the helical binder and including a shaft, a plurality of book aligning fingers mounted on said shaft, means supporting said shaft for rotatable movement about its own axis, means to rotate said shaft, means for supporting said shaft for pivotal movement about an axis in advance of the central axis of said shaft means to cause said shaft to have a pivoting motion, means for clamping the thus arranged book to the table, means for feeding a helically shaped binder through the apertures of the clamped book, means for cutting to proper length the binder fed through the apertures of the book and for securing such cut binder in position on the book, and operating and control means to actuate said shaft, clamping means, binder feeding means, and binder cutting and securing means in timed relationship to one another, the combination with said rearranging means of means to progressively shift said shaft and aligning fingers in a longitudinal direction during the advancing and retracting pivoting movement of said shaft and during the advancement and retraction of said aligning fingers with relation to the book.

2. Apparatus such as claimed in claim 1, in which said last mentioned means includes a lead screw fixed to said means for supporting said shaft for pivoting movement and a threaded portion of said supporting means threadedly engaging such lead screw.

3. Apparatus such as claimed in claim 1, in which said clamping means includes a pivoted clamp, spring means tending to advance said clamp to clamping position, means operable to control the position of said pivoted clamp, means controlled by said rearranging means to actuate said clamp control means to enable said clamp to be moved to clamping position by said spring means, and means controlled by said cutting and securing means to actuate said clamp control means to move said clamp to a retracted position against the tension of said spring means.

4. Apparatus such as claimed in claim 1, in which said cutting and securing means carry positioning members for properly positioning a book on the table and including means operable to cause the withdrawal of such positioning members in the advancing movement of such rearranging means, and means controlled by said rearranging means and operable thereby when the aligning fingers of the latter fail to properly reshape the book apertures during such advancing movement, said last mentioned means constructed and arranged to interrupt the normal cycle of operation of the machine and to cause the immediate retraction of said aligning fingers and the immediate advancement of such positioning members to their book positioning station relative to the table when so rendered operable by said rearranging means.

5. Apparatus such as claimed in claim 1, including means to ready said cutting and securing means for their cutting and securing operations, means controlled by said rearranging means and operable thereby when the aligning fingers of the latter fail to properly reshape the book apertures during the advancing movement of said rearranging means, said last mentioned means being constructed and arranged to interrupt the normal cycle of operation of the machine and to cause the immediate retraction of said aligning fingers and the immediate return of said cutting and securing means to their starting positions when so rendered operable by said rearranging means.

6. Apparatus such as claimed in claim 1, including means constructed and arranged to be actuated by the feeding binder and operative upon an improper feeding thereof to immediately interrupt the normal cycle of operation of the machine and stop the feed of the wire by said feeding means.

7. Apparatus such as claimed in claim 1, including means constructed and arranged to be actuated by the feeding binder and operative upon an improper feeding thereof to immediately interrupt the normal cycle of operation of the machine and to cause the immediate operation of the cutting mechanism of said cutting and securing means so as to clear the machine and bring the parts back to their starting position for a new cycle.

8. Apparatus such as claimed in claim 1, including a frame, means connected to said frame for supporting the front end of said table for pivotal movement about a fixed axis, resilient means for normally urging the rear edge of the table to a position above that to be desired for the thinnest book to be rearranged by said rearranging means and bound by said feeding means and said cutting and securing means, and means intermediate said supporting means and said resilient means for adjusting the rear edge of the table against the bias of said resilient means to a height less than that to which it is normally urged by said resilient means and at which such rear edge is correlated to said rearranging, binder feeding and binder cutting and securing means with respect to the book to be bound thereby.

9. Apparatus such as claimed in claim 8, in which the adjusting means includes a scale computed with respect to the center line of the binders capable of being fed by said binder feeding means and arranged about an opening in the table, an adjustable member carrying an indicator located in such table opening and seated on a portion of the table fixed with relation to the book supporting surface thereof, and a threaded member secured to said adjustable member and threadedly engaged on a fixed portion of the frame beneath the table.

10. Apparatus such as claimed in claim 9, in which the seating portion of the table comprises a seating member secured to the table and having a knife edge located in the table opening, in which said adjustable member is a bolt-like member having a tool manipulative head portion seated on the knife edge of the seating member, in which the threaded member constitutes the shank of such bolt-like member and extends through the fixed portion of the frame located below the opening, and a compression spring mounted on the lower projecting end of such shank and bearing against the undersurface of the fixed portion of the frame.

11. Apparatus such as claimed in claim 1, in which said aligning fingers have a predetermined arcuate curvature, and including means controlling the axial movement of said shaft and constructed and arranged to be operative in the advancing rotative movement of said aligning fingers about said shaft to stop the axial movement of the latter at a predetermined point such as will cause such fingers during the pivoting movement of such shaft to pass through the apertures with a movement eccentric to the axis of pivotal movement of said shaft and sufficient to cause the outer surfaces of the curved fingers to force the pages of the book forwardly away from the axis of pivotal movement of such shaft.

12. Apparatus such as claimed in claim 11, in which said shaft controlling means comprises a stationary stop and a member on said shaft engageable with said stop, the arrangement of said stop and member being such that they engage to stop the rotation of said shaft about its own axis in its advancement of the aligning fingers prior to the point at which the center of curvature of the aligning fingers will advance into coincidence with the axis of pivotal movement of such shaft.

13. Apparatus such as claimed in claim 1, including lever means connected to said shaft, means for actuating said lever means to initially rotate said shaft about its own axis and then to rotate said shaft about the axis in advance of such shaft axis, and spring means mounted on said shaft so as to normally urge the aligning fingers into the book during the initial rotary movement of such shaft and to yieldingly resist movement of the shaft about its axis when withdrawing such fingers from the book.

14. Apparatus as claimed in claim 1, in which the clamping means includes a clamp member for engaging the top of the book on the table adjacent to the apertures thereof, means pivotally supporting said clamp member, a lever connected to said clamp member, spring means normally biasing the lever to hold the clamp member in position on a book, a solenoid connected to the lever and operable to actuate it to withdraw the clamp member against the tension of the spring, and means for controlling said solenoid.

15. Apparatus as claimed in claim 14, including a binder guide bar, means pivotally supporting said guide bar, and means connecting the guide bar to said solenoid, the connecting means being constructed and arranged to enable the solenoid to withdraw the guide bar with the book clamp and to enable the guide bar to drop into operative position under its own weight.

16. Apparatus as claimed in claim 1, in which said feeding means comprises a die, a pair of cooperative feed rollers for feeding wire into said die and a rotatable shaft supporting each of said rollers, and wherein one of said shafts is mounted for pivotal movement to enable its associated roller to be moved into and out of operative feeding relation with the other roller, means connected to the pivotal shaft for controlling its position including a pivoted lever and a toggle connection between said lever and said pivotal shaft and coacting with said lever to control the position of said pivotal shaft, and means controlling said lever.

17. Apparatus as claimed in claim 1, in which the feeding means includes a die for forming the wire into a helical shape, a lubricant reservoir, means for forcing air through said reservoir and into said die, a valve controlling the feed of lubricant and air from said reservoir to said die, and means controlling said valve.

18. Apparatus as claimed in claim 1, in which said feeding means includes a die having a mandrel provided with an external helical groove along a portion thereof, a die cap enclosing said grooved portion of the mandrel, means for forcing a wire between said grooved portion and said die cap, and means at the discharge end of said grooved portion for controlling the pitch of the formed wire and comprising a recess formed in said mandrel at the exit end of said helical groove and being in communication with said groove, a conically shaped member extending into such recess, and means for adjusting the position of said member relative to such recess.

19. An apparatus as claimed in claim 1, in which the cutting and securing means include two spaced units mounted for slidable movement in a vertical direction and a horizontally disposed, vertically movable bar for simultaneously raising said units into operative position, and wherein there is included means controlled by said bar and constructed and arranged to come into operation to prevent the rearranging means from advancing to rearrange the book unless such bar is in a lowered position.

20. Apparatus as claimed in claim 1, in which the cutting and securing means include two spaced units mounted for slidable movement in a vertical direction and a horizontally disposed, vertically movable bar for simultaneously raising said units into operative position, and wherein each of said units includes a yieldable unit supporting member projecting downwardly therefrom and seated on said bar, an actuating member projecting downwardly from said unit and having its lower end terminating at a point spaced upwardly from the normal position of the lower end of said supporting member so as to be normally out of contact with said bar, means for moving the bar upwardly to raise said units, and means for stopping the upward movement of said units before the bar has finished its upward stroke, whereby the supporting member of said units yieldably permit said bar to come into engagement with and to operate said actuating members of such units.

21. Apparatus as claimed in claim 1, in which the cutting and securing means include two spaced cutting and bending units mounted for slidable movement in a vertical direction and a horizontally disposed vertically movable bar supporting said units, and wherein each of said units includes a spring loaded plunger projecting downwardly therefrom and seated on said bar, an actuating plunger projecting downwardly from each unit and having its lower end inwardly spaced from said bar, means for raising and lowering said bar, and means for stopping the upward movement of said units before said bar has finished its upward stroke, whereby said spring loaded plungers are depressed to enable said bar on its continued upward movement to come into engagement with and to operate said actuating plungers.

22. Apparatus as claimed in claim 1, in which the cutting and securing means includes two units mounted for slidable movement in a vertical direction, and a horizontally disposed, vertically movable bar supporting said units, and wherein means are provided for moving the bar, said bar moving means including a support for said bar, a rotatably supported shaft located before said support, means for reciprocally rotating said shaft, an upwardly inclined arm secured to the shaft so that its outer end moves between said shaft and said support during the reciprocal rotation of said shaft, a link connecting said arm to the support, whereby when the shaft is rotated in one direction to raise said bar, the latter will reach the peak of its upward stroke before such shaft has finished its rotative movement in such direction and will then come to rest at a point below such peak when the shaft finishes its movement, means on said units actuated by said bar in its travel to the peak of its movement to operate the cutting mechanism thereof and means on said units for restoring the cutting mechanism to normal condition after said bar has passed the peak of its upward stroke.

23. Apparatus as claimed in claim 1, including a projecting member on said shaft arranged so that its outer end rotates about a point contained in said advanced axis of pivotal movement during the normal pivoting movement of the shaft about such axis, a movable member engaged by the outer end of said projecting member and arranged to be depressed by the latter when said shaft has pivotal movement about an axis other than its normal axis of pivotal movement, and means controlled by said movable member and controlling said means for rotating said shaft to render the latter inoperative to advance said shaft when said movable member is depressed.

24. Apparatus as claimed in claim 1, including means to advance said rearranging means to arrange the pages of the book, means to retract said rearranging means after the book pages have been so arranged in a normal binding cycle, means for interrupting the binder cycle and for rendering said advancing means in operative in an abnormal condition of operation of said rearranging means, and means controlled by said rearranging means for controlling said interrupting means.

25. Apparatus as claimed in claim 1, including a control member carried by said shaft, a switch controlled by said shaft, a second switch controlled by said control member, and means controlled by said switches for controlling the rearranging means and constructed and arranged to render said shaft rotating means inoperative to further rotate the shaft under an abnormal book aligning condition.

26. Apparatus as claimed in claim 1, including means located between said feeding means and the book on the table to be bound and comprising a member engaging the binder fed by said feeding means and constructed to translate an increase in the diameter of such binder due to an abnormal condition into linear motion, and means controlled by said member and constructed and arranged to interrupt the normal cycle of the machine by stopping the feed of the wire by said feeding means and by immediately actuating the cutting mechanism of said cutting and securing means ahead of its normal period of operation.

27. Apparatus as claimed in claim 1, including control means comprising a member located at a predetermined point in the path of travel of the feeding binder, and arranged to be engaged by the advancing end of such binder, and means actuated by said control means when the feeding binder engages said member to render said feeding means inoperative.

MILTON H. NOVEMBER.

References Cited in the file of this patent

UNITED STATES PATENTS

| Number | Name | Date |
|---|---|---|
| 2,080,842 | Thurston | May 18, 1937 |
| 2,101,804 | Bidwell | Dec. 7, 1937 |
| 2,166,519 | Catini | July 18, 1939 |
| 2,168,865 | Fischer | Aug. 8, 1939 |
| 2,177,015 | Boettger | Oct. 24, 1939 |
| 2,182,844 | Grumbacher | Dec. 12, 1939 |
| 2,240,903 | Freundlich | May 6, 1941 |
| 2,262,994 | Dickey | Nov. 18, 1941 |
| 2,300,544 | Freundlich | Nov. 3, 1942 |
| 2,388,106 | Woller | Oct. 30, 1945 |
| 2,470,812 | Gauci | May 24, 1949 |